United States Patent
Criscione et al.

(10) Patent No.: US 12,546,701 B2
(45) Date of Patent: Feb. 10, 2026

(54) MULTICHANNEL OPTICAL SWITCH FOR IN-LINE SPECTROSCOPIC COMPOUND ANALYSIS

(71) Applicant: Enquyst Technologies Inc., Lowell, MA (US)

(72) Inventors: Jason M. Criscione, Chelmsford, MA (US); Ali Ersen, Chestnut Hill, MA (US)

(73) Assignee: Enquyst Technologies Inc., Lowell, MA (US)

( * ) Notice: Subject to any disclaimer, the term of this patent is extended or adjusted under 35 U.S.C. 154(b) by 0 days.

(21) Appl. No.: 18/988,759

(22) Filed: Dec. 19, 2024

(65) Prior Publication Data

US 2025/0198905 A1   Jun. 19, 2025

Related U.S. Application Data

(60) Provisional application No. 63/611,846, filed on Dec. 19, 2023.

(51) Int. Cl.
  *G01N 15/1434* (2024.01)
  *G01N 15/075* (2024.01)
  *G01N 21/31* (2006.01)

(52) U.S. Cl.
  CPC ....... *G01N 15/1434* (2013.01); *G01N 15/075* (2024.01); *G01N 21/31* (2013.01)

(58) Field of Classification Search
  None
  See application file for complete search history.

(56) References Cited

U.S. PATENT DOCUMENTS 6,453,084 B1 * 9/2002 Stanford ............. G02B 6/3588
                                                         385/18
9,494,579 B2   11/2016 Schwoebel et al.
(Continued)

FOREIGN PATENT DOCUMENTS

JP         2007155494 A  *  6/2007

OTHER PUBLICATIONS

Zhang, Chao-Xuan, and Andreas Manz. "High-speed free-flow electrophoresis on chip." Analytical chemistry 75.21 (2003): 5759-5766. (Year: 2003).*

(Continued)

*Primary Examiner* — Rufus L Phillips
(74) *Attorney, Agent, or Firm* — Wan Chieh Lee; Haug Partners LLP

(57) ABSTRACT

Systems and methods for in-line spectroscopic compound analysis are provided. The in-line spectroscopic compound analysis system comprises a reference optical flow cell to continuously receive a reference fluid, a plurality of sample optical flow cells to continuously receive a sample fluid and a single electromagnetic radiation (EMR) source. The system includes a multichannel optical switch for receiving the EMR from the single EMR source. Each EMR beam passes through each of the reference optical flow cell and the sample optical flow cells. The system also includes a plurality of detectors, each of which receiving EMR from each of the reference optical flow cell and the sample optical flow cells. The system further comprises a controller operably coupled with the detectors and configured to continuously detect a property of the sample in each of the sample optical flow cells with respect to the reference optical flow cell.

22 Claims, 8 Drawing Sheets

(56) References Cited

U.S. PATENT DOCUMENTS

| | | |
|---|---|---|
| 10,809,164 B2 | 10/2020 | Young et al. |
| 2003/0151744 A1* | 8/2003 | Fernando ............... G01J 3/0218 |
| | | 356/319 |
| 2004/0061854 A1* | 4/2004 | Walker ................... G01N 21/05 |
| | | 356/319 |
| 2013/0209034 A1* | 8/2013 | Jono ..................... G01N 21/645 |
| | | 385/33 |
| 2013/0308121 A1 | 11/2013 | Some et al. |
| 2014/0146317 A1* | 5/2014 | Arimoto ............... G01J 3/0297 |
| | | 356/402 |
| 2014/0374630 A1* | 12/2014 | Saiyed ............... G01N 15/1434 |
| | | 250/575 |
| 2015/0025341 A1* | 1/2015 | Sakota ................. A61B 5/1455 |
| | | 600/322 |
| 2015/0099309 A1* | 4/2015 | Krufka .................. G01J 3/2803 |
| | | 436/171 |
| 2017/0059477 A1* | 3/2017 | Feitisch .................... G01J 3/42 |
| 2021/0299660 A1* | 9/2021 | Denomme ........ B01L 3/502784 |
| 2021/0318230 A1* | 10/2021 | Luy ......................... G01N 21/05 |
| 2022/0011236 A1* | 1/2022 | Mason .................... G01N 21/75 |
| 2022/0057317 A1 | 2/2022 | Yamamoto et al. |

OTHER PUBLICATIONS

International Search Report mailed on Apr. 17, 2025 in corresponding International application No. PCT/US2024/061200.

\* cited by examiner

MULTICHANNEL OPTICAL SWITCH FOR IN-LINE SPECTROSCOPIC COMPOUND ANALYSIS

PRIORITY CLAIM

This application claims priority to U.S. Provisional Application Ser. No. 63/611,846 entitled "Multichannel Optical Switch for In-Line Spectroscopic Compound Analysis" filed on Dec. 19, 2023.

FIELD OF THE INVENTION

The present disclosure relates generally to new systems and methods for compound analysis.

BACKGROUND

Manufacturing of biologic therapeutic products, such as, for example, peptides, proteins, antibodies, oligonucleotides, and viral vectors that are to be used therapeutically in humans often require purification of the biologic products. Purification processes for such biologic therapeutic products often require rigorous quality control. Some of the known monitoring and control techniques are conducted by static sampling. A need therefore exists for in-line process analytical technologies (PATs) that provide improved real-time spectroscopic monitoring of a continuous processing platform. As used herein, PAT includes, for example, a system for analyzing, and/or controlling manufacturing through timely measurements (i.e., during processing or real-time) of product quality properties of a continuous processing platform.

BRIEF SUMMARY

In one aspect of the present application, a detection system comprising at least one reference optical flow cell configured to continuously receive a reference fluid, at least one sample optical flow cell configured to continuously receive a sample and a single electromagnetic radiation (EMR) source is disclosed. The detection system further comprises a multichannel optical switch configured to receive the EMR from the single EMR source. The multichannel optical switch comprising a fiber optic switch configured to generate a plurality of EMR beams from the single EMR source. Each EMR beam is configured to pass through each of the at least one reference optical flow cell and the at least one sample optical flow cell. The detection system further comprises a plurality of detectors. Each one of the plurality of detectors configured to receive EMR from each of the at least one reference optical flow cell and the at least one sample optical flow cell. The detector system further comprises a controller operably coupled with the plurality of detectors and configured to continuously detect a property of the sample in each of the sample optical flow cells with respect to the at least one reference optical flow cell.

In some examples, the single EMR source comprises a light emitting diode, a laser, a lamp, or a bulb. In some examples, the single EMR source emits radiation having a wavelength ranging between 190-1100 nm. In some examples, the single EMR source emits a single wavelength. In some examples, the single EMR source is collimated. In some examples, the at least one reference optical flow cell and the at least one sample optical flow cell each comprise at least one optical interface coupler configured to create a discrete optical path orthogonal to the reference fluid or sample fluid. In some examples, the at least one reference optical flow cell and the plurality of sample optical flow cells are optically opaque or transparent. In some examples, the at least one reference optical flow cell and the at least one sample optical flow cell have an optical path length ranging from about 0.1 mm to about 10 cm. In some examples, the at least one reference optical flow cells provide internal calibration of the system via a feedback loop derived from the reference fluid. In some examples, the reference fluid is received by a continuous supply, a re-circulated supply, or a statically held supply.

The detection system may further comprise fiber optic cables. In some examples, the fiber optic cables may have a numerical aperture ranging from 0.1 to 0.6. In some example, the fiber optic cables comprise a core diameter ranging from 0.1 mm to 1 mm. In some examples, the fiber optic switch comprises at least one electromechanical switch to sequentially divert the EMR derived from the single EMR source to the at least one reference optical flow cell and the at least one sample optical flow cell.

In some examples, the multichannel optical switch comprises at least one fiber optic switch, and wherein each EMR beam is generated from the single EMR source in less than 50 milliseconds. In some examples, the plurality of detectors comprise a photodiode detector, a photodiode array detector, a diode array detector, a photomultiplier tube, or a charge-couple device (CCD) detector. The plurality of detectors may further comprise at least one bandpass filter. In some examples, the plurality of detectors are configured to receive EMR at least one angle. In some examples, the reference fluid and sample fluid comprise aqueous liquid media, organic solvent liquid media, or combinations thereof. In some examples, the reference fluid and sample fluid are received by the reference optical flow cell and the sample optical flow cell, respectively, at equivalent flow rates, different flow rates, or combinations thereof. In some examples, the reference fluid and sample fluid are received at flow rates ranging from about 0.01 mL/hr to about 1 L/min. In some examples, the sample comprises organic small-molecules, organic macromolecules, metal complexes, metal chelates, polymers, microparticles, nanoparticles, biological products, liposomes, lipid nanoparticles, exosomes, extracellular vesicles, membrane vesicles, cells, viruses, bacteria, capsids, virus-like particles, peptides, proteins, antibodies, oligonucleotides, plasmids, mRNA, siRNA, RNAi, microRNA, adenoviruses, lentiviruses, adeno-associated viruses, oncolytic viruses, or combinations thereof. In some examples, the detection system is configured to receive a sample from a flow-based or pressure driven flow-based apparatus. The flow-based or pressure driven flow-based apparatus may be a free-flow electrophoresis apparatus.

In another aspect of the present application, a method for detecting a property of at least one sample is provided. The method comprises continuously receiving, via a sample inlet line, at least one sample fluid, to a sample optical flow cell. The optical flow cell comprises at least one optical interface coupler to create an optical path orthogonal to the fluid path. The method further comprises continuously receiving, via a reference inlet line, at least one reference fluid, to a reference optical flow cell. The reference optical flow cell comprises at least one optical interface coupler to create an optical path orthogonal to the fluid path. The method further comprises directing an electromagnetic radiation (EMR) beam through each of the sample optical flow cell and the reference optical flow cell. The beam originates from a single EMR source and passes through a multichannel optical switch before being directed through each of the sample optical flow cell and the reference optical flow cell. The method further comprises detecting EMR from each of the sample optical flow cell and the reference optical flow cell, and continuously determining a property of the sample through an algorithm.

In another aspect of the present application, an in-line, absorption spectroscopy detection system is provided. The system comprises at least one reference optical flow cell configured to continuously receive a reference fluid, at least one sample optical flow cell configured to continuously receive a sample, a single electromagnetic radiation (EMR) source, two optical interface couplers per optical flow cell, and a multichannel optical switch configured to receive the EMR from the single EMR source. The multichannel optical switch comprising a fiber optic switch configured to generate a plurality of EMR beams from the single EMR source, wherein each EMR beam is configured to pass through each of the at least one reference optical flow cell and the at least one sample optical flow cells. The system further comprises a plurality of detectors. Each one of the plurality of detectors configured to receive a transmitted EMR from one of the at least one reference optical flow cells and the at least one sample optical flow cell. The system further comprise a controller operably coupled with the plurality of detectors and configured to continuously detect the concentration of the sample in each of the optical flow cells.

In another aspect of the present application, an in-line, fluorescence spectroscopy detection system. The system comprises at least one reference optical flow cells configured to continuously receive a reference fluid, at least one sample optical flow cell configured to continuously receive a sample, a single electromagnetic radiation (EMR) source, two optical interface couplers per optical flow cell, and a multichannel optical switch configured to receive the EMR from the single EMR source. The multichannel optical switch comprising a fiber optic switch configured to generate a plurality of EMR beams from the single EMR source. Each EMR beam is configured to pass through each of the at least one reference optical flow cell and the at least one sample optical flow cell. The system further comprises a plurality of detectors, each one of the plurality of detectors configured to receive a transmitted EMR from one of the at least one reference optical flow cell and the at least one sample optical flow cell, at least one bandpass filter, and a controller operably coupled with the plurality of detectors and configured to continuously detect the concentration of the sample in each of the optical flow cells.

In another aspect of the present application, an in-line, multi-angle light scattering detection system is provided. The system comprises at least one reference optical flow cell configured to continuously receive a reference fluid, at least one sample optical flow cells configured to continuously receive a sample, a single electromagnetic radiation (EMR) source, at least one optical interface coupler per optical flow cell, and a multichannel optical switch configured to receive the EMR from the single EMR source. The multichannel optical switch comprising a fiber optic switch configured to generate a plurality of EMR beams from the single EMR source. Each EMR beam is configured to pass through each of the at least one reference optical flow cell and the at least one sample optical flow cell. The system further comprises a plurality of detectors positioned at a plurality of angles. Each one of the plurality of detectors configured to receive transmitted EMR, scattered EMR, or combinations thereof, from the at least one reference optical flow cell and the at least one sample optical flow cell. The system further comprises a controller operably coupled with the plurality of detectors and configured to continuously detect the size of the sample in each of the optical flow cells.

These and other aspects of the invention will become apparent to those skilled in the art after a reading of the following detailed description of the invention, including the figures and appended claims.

DESCRIPTION OF THE DRAWINGS

FIG. 3E is a graph showing the stable signal (% Transmittance) of the opaque reference flow cell.

FIG. 4E is a graph showing the stable signal (A280) of the opaque reference flow cell.

FIG. 5B is a bar graph showing the signal (% Transmittance; % T) at each detector of the opaque sample and reference flow cells.

FIG. 6B shows the signal (% Transmittance; % T) at each detector of the opaque sample and reference flow cells during prolonged, continuous operation.

Figure 1A:
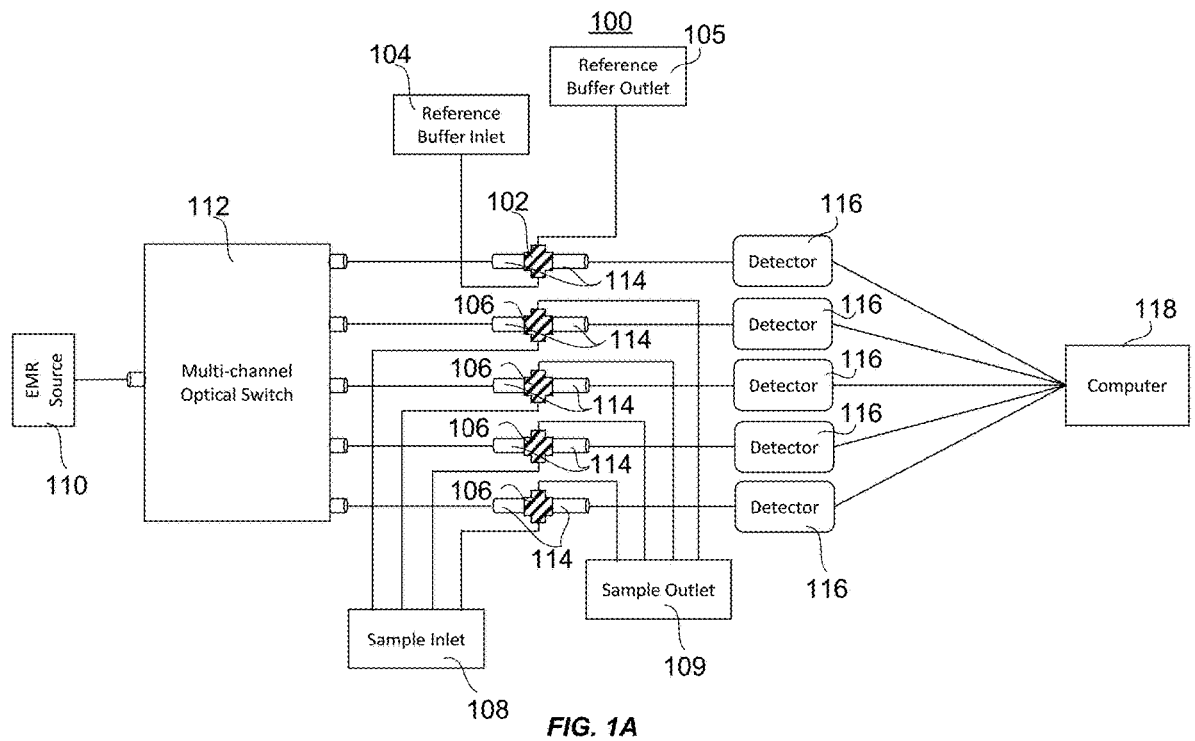
FIG. 1A is a schematic diagram of an exemplary multichannel, in-line detection system (e.g., in-line UV detection system) comprising at least one opaque reference flow cell, at least one opaque sample flow cell, at least one detector, and a single electromagnetic radiation source.

These and other objects, features, and advantages of the exemplary embodiments of the present disclosure will become apparent upon reading the following detailed description of the exemplary embodiments of the present disclosure, when taken in conjunction with the entire specification.

DETAILED DESCRIPTION

The following definitions are included for the purpose of understanding the present subject matter and for constructing the appended patent claims. The abbreviations used herein have their conventional meanings within the chemical and biological arts.

While various embodiments and aspects of the present invention are shown and described herein, it will be obvious to those skilled in the art that such embodiments and aspects are provided by way of example only. Numerous variations, changes, and substitutions will now occur to those skilled in the art without departing from the invention. It should be understood that various alternatives to the embodiments of the invention described herein may be employed in practicing the invention.

The section headings used herein are for organizational purposes only and are not to be construed as limiting the subject matter described. All documents, or portions of documents, cited in the application including, without limitation, patents, patent applications, articles, books, manuals, and treatises are hereby expressly incorporated by reference in their entirety for any purpose.

Unless defined otherwise, technical and scientific terms used herein have the same meaning as commonly understood by a person of ordinary skill in the art. See, e.g., Singleton et al., DICTIONARY OF MICROBIOLOGY AND MOLECULAR BIOLOGY 2nd ed., J. Wiley & Sons (New York, NY 1994); Sambrook et al., MOLECULAR CLONING, A LABORATORY MANUAL, Cold Springs Harbor Press (Cold Springs Harbor, NY 1989). Any methods, devices, and materials similar or equivalent to those described herein can be used in the practice of this invention. The following definitions are provided to facilitate understanding of certain terms used frequently herein and are not meant to limit the scope of the present disclosure.

Unless specifically stated or obvious from context, as used herein, the term "or" is understood to be inclusive. Unless specifically stated or obvious from context, as used herein, the terms "a," "an," and "the" are understood to be singular or plural.

The term "about" when used in reference to numerical ranges, cutoffs, or specific values is used to indicate that the recited values may vary by up to as much as 25% from the listed value. As many of the numerical values used herein are experimentally determined, it should be understood by those skilled in the art that such determinations can, and often times will, vary among different experiments. The values used herein should not be considered unduly limiting by virtue of this inherent variation. The term "about" is used to encompass variations of ±25% or less, variations of ±20% or less, variations of 10% or less, variations of ±5% or less, variations of ±1% or less, variations of ±0.5% or less, or variations of ±0.1% or less from the specified value. About can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 60 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 60 may comprise 1 to 10, 1 to 20, 1 to 30, and 1 to 40 in one direction, or 50 to 40, 50 to 30, 50 to 20, and 50 to 10 in the other direction.

The transitional term "comprising," which is synonymous with "including," "containing," or "characterized by," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

In the descriptions herein and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The term "continuous" or "semi-continuous" refers to a process by which the analysis of a sample is performed substantially with or without interruption or with minor interruption or with unintended interruption for prolonged periods of time. For example, the method of receiving, via a sample inlet line, at least one sample fluid, to a sample optical flow cell, receiving, via a reference inlet line, at least one reference fluid, to a reference optical flow cell, directing an electromagnetic radiation (EMR) beam through each of the sample optical flow cell and the reference optical flow cell, detecting transmitted, absorbed, or emitted EMR from each of the sample optical flow cell and the reference optical flow cell, and determining a property of the sample is done without interruption, or with minor interruption, for example, a millisecond range time delay.

In other examples, the process of performing an internal calibration via a continuous feedback loop derived from the reference optical flow cells is also done with or without minor interruption, for example, a millisecond range time delay.

The terms "semi-continuous" and "intermittent" and "interrupted" mean that one or more of the processes or elements of an integrated system operate in a discontinuous or batch-wise manner, for example, fed-batch modes of operation, while other processes or elements of the integrated system operate in a continuous manner.

The methods and processes described herein may be continuous, semi-continuous, or not continuous.

The term "integrated," as used in reference to multiple apparatuses, modules, systems and/or processes, means that the apparatuses, modules, systems and/or processes are physically and logistically connected so as to constitute a unified system capable of operating continuously. In the context of the system of the present invention, which is directed to an integrated continuous or semi-continuous system for analyzing or detecting a property in a sample, an integrated system will connect different components directly and in a manner sufficient to maintain continuous flow between the different components of the system.

The present application is directed to in-line process analytical technologies (PATs) that provide real-time spectroscopic monitoring of (1) process parameters and (2) impurity and product profiles of a continuous processing platform. The in-line PATs described in the present application combines flow cell design with the ability to have a reference derived from the same incident light source as samples to be measured to provide real-time, in-line monitoring systems.

The present application incorporates in-line flow cells rather than static cuvettes (e.g., for a static system), which allows for a liquid to continuously move through the system to provide continuous process monitoring. The present application provides an in-line monitoring system that can analyze samples that are in motion (e.g., continuous) with in-line reference and sample flow cells to maintain the benefits of a double beam design—specifically, (1) spectral drift correction, (2) light source degradation correction, (3) baseline correction, and (4) detector fluctuations and variability.

In one aspect of the present application, systems and methods for spectroscopic compound analysis are provided.
Systems FIG. 1A shows a schematic diagram of an exemplary multi-channel, in-line detection system 100 (e.g., in-line UV detection system) comprising at least one opaque reference flow cell 102, at least one opaque sample flow cell 106, at least one detector 116, and a single electromagnetic radiation (EMR) source 110. The detection systems 100 described herein provide for the ability to analyze, in real-time, a number of different samples in-line, as well as their appropriate in-line references. Significantly, the systems 100 allow for the use of a single electromagnetic radiation (EMR) source 110 that is used for the detection of the property within the sample and/or the reference.

In aspects, provided herein is a detection system 100 including at least one or a plurality of reference optical flow cells 102 configured to continuously receive a reference fluid (e.g., from a reference buffer inlet 104 to a reference buffer outlet 105); at least one or a plurality of sample optical flow cells 106 configured to continuously receive a sample (e.g., from a sample inlet 108 to a sample outlet 109); a single EMR source 110; a multichannel optical switch 112 configured to receive the EMR from the single EMR source 112; at least one optical interface coupler 114; a plurality of detectors 116, each one of the plurality of detectors 116 configured to receive a EMR from each of the reference optical flow cells 102 and each of the sample optical flow cells 106; and a controller 118 operably coupled with the detectors 116 and configured to detect a property of the sample. In embodiments, the controller 118 is operably coupled with the plurality of detectors 116 and configured to continuously detect a property of the sample in each of the optical flow cells 106 with respect to at least one reference optical flow cell 102. The multichannel optical switch 112 includes a fiber optic switch, which is configured to generate a plurality of EMR beams from the single EMR source 110. Each EMR beam is configured to pass through each of the reference optical flow cells 102 and plurality of sample optical flow cells 106.

Figure 2:
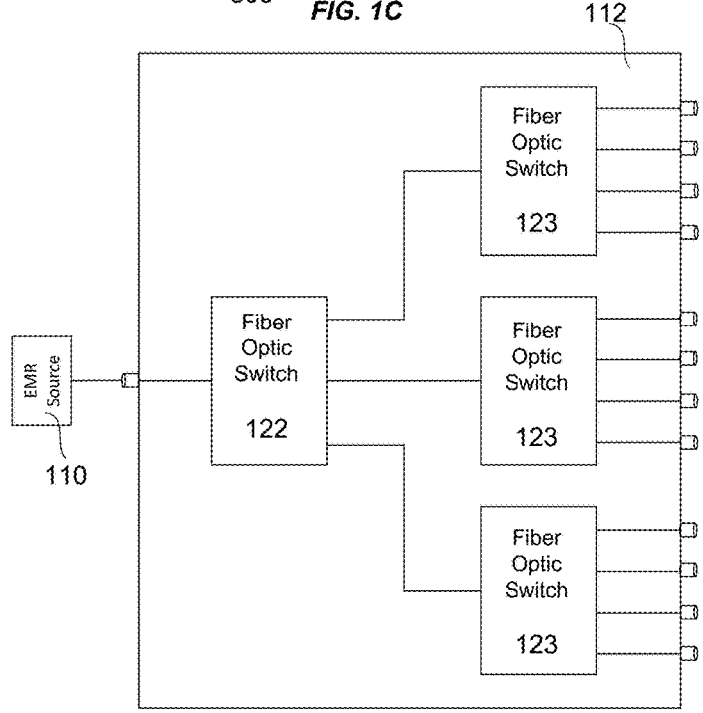
FIG. 2 is a schematic diagram of an exemplary optical switch.

In one example, the multichannel optical switch 112 may include one or more fiber optic switches to generate a plurality of EMR beams from the single EMR source 110. For example, as shown in FIG. 2, the multichannel optical switch 112, may comprise one or more tiers of fiber optic switches. In particular, a first tier of fiber optic switch 122 may be configured to receive a single EMR beam from the single EMR source 110 and to generate a plurality of EMR beams. Each of the plurality of EMR beams from the first tier fiber optic switch 122 may be further transmitted to a second tier of fiber optic switches 123, which is configured to generate a plurality of EMR beams from a single beam from the first tier of fiber optic switch 122. Although FIG. 2 illustrates two tiers of fiber optic switches, it is contemplated that additional tiers of fiber optic switches may be utilized to further generate additional EMR beams from EMR beams from the second tier fiber optic switches 123.

The controller 118 is configured to detect a property in the sample, for example, the concentration of the compound in the sample. The controller 118 is further configured to perform an internal calibration through a continuous feedback loop, which is derived from the at least one or the plurality of reference optical flow cells 102. The internal calibration of the controller 118 provides for real time correction, including baseline correction, spectral drift correction, EMR source degradation correction, EMR source power normalization, or any combinations thereof.

As provided herein, the single EMR source 110 includes a light emitting diode, a laser, a lamp, or a bulb. In embodiments, the single EMR source 110 emits radiation having a wavelength ranging between 190-1100 nm. In embodiments, the wavelength is between 190-1000 nm, or between 190-900 nm, or between 190-800 nm, or between 190-700 nm, or between 190-600 nm, or between 190-500 nm, or between 190-400 nm, or between 190-300 nm, or between 190-200 nm. In some embodiments, the wavelength is 280 nm. In some embodiments, the wavelength is 260 nm. In some embodiments, the wavelength is 650 nm.

In embodiments, the system 100 includes a single EMR source 110, and the EMR source 110 emits a single wavelength, e.g., 280 nm (as a measurement for protein concentration).

In embodiments, the system 100 includes a single EMR source 110, and the EMR source is collimated. The collimated EMR (e.g., a guided beam of light) includes a guided EMR beam and allows for minimal spread of the EMR as it propagates.

The detection system 100 described herein has at least one or a plurality of reference optical flow cells 102 and at least one or a plurality of sample optical flow cells 106, each including at least one optical interface coupler 114 configured to create a discrete optical path orthogonal to the reference fluid or sample fluid. In some embodiments, the optical flow cells 102, 106 comprise one optical interface coupler. In other embodiments, the optical flow cells 102, 106 comprise two optical interface couplers. In some examples, the at least one or the plurality of reference optical flow cells 102 and the at least one or the plurality of sample optical flow cells 106 are opaque. In other examples, the at least one or the plurality of reference optical flow cells 102 and the at least one or the plurality of sample optical flow cells 106 are transparent. Moreover, the at least one or the plurality of reference optical flow cells 102 and the at least one or the plurality of sample optical flow cells 106 have an optical path length ranging from about 0.1 mm to about 10 cm. In other examples, the optical path length ranges from about 0.1 mm to 1 mm or about 1 to 10 mm. For example, the flow cells 102, 106 have an optical path length ranging from about 0.1 mm to about 1 mm, or from about 1 mm to about 5 mm, or from about 1 mm to about 10 mm, or from about 1 mm to about 15 mm, or from about 1 mm to about 20 mm. In further examples, the optical path length has a diameter from about 0.1 mm to about 10 mm. In embodiments, the path length is 5 mm. In embodiments, the path length is about 5 mm.

As described herein the detection system 100 includes at least one or a plurality of reference optical flow cells 102 that provide for a real-time internal calibration of the system. The real-time internal calibration is realized through a feedback loop control derived from the reference fluid. For example, the reference fluid is received by a continuous supply, by a re-circulated supply, a statically held supply (e.g., from the reference buffer inlet 104 to the reference buffer outlet 105). As described above, the controller 118 is configured to perform an internal calibration through a continuous feedback loop, which is derived from the at least one or the plurality of reference optical flow cells 102. The internal calibration of the controller 118 provides for real time correction, including baseline correction, spectral drift correction, EMR source degradation correction, EMR source power normalization, detector response normalization, or any combinations thereof.

In embodiments, the detection system 100 includes a fiber optic cable configured from the single EMR source 110 to the multichannel optical switch 112. In embodiments, the detection system 100 includes fiber optic cables configured from the multichannel optical switch 112 to the plurality of flow cells 102, 106 via an optical interface coupler 114.

In embodiments, the fiber optic cables have a numerical aperture ranging from 0.1 to 0.6. In embodiments, the fiber optic cables of the detection system 100 have a numerical aperture ranging from 0.1 to 0.6, or from 0.1 to 0.5, or from 0.1 to 0.4, or from 0.1 to 0.3, or from 0.1 to 0.2, or from 0.2 to 0.6, or from 0.2 to 0.5, or from 0.2 to 0.4, or from 0.2 to 0.3, or from 0.3 to 0.6, or from 0.3 to 0.5, or from 0.3 to 0.5. In embodiments, the numerical aperture is 0.22.

In embodiments, the detection system 100 described herein includes fiber optic cables that have core diameter ranging from 0.1 mm to 1 mm. In some embodiments, the detection system 100 includes fiber optic cables that have a core diameter ranging from about 0.1 mm to 1 mm, or from 0.1 mm to 0.5 mm, or from 0.1 mm to about 0.2 mm. In embodiments, the core diameter is 0.6 mm (600 μm).

In other embodiments, the detection system 100 includes a fiber optic switch that has at least one electromechanical switch to sequentially divert the EMR derived from the single light source to the at least one or the plurality of reference optical flow cells 102 and the at least one or the plurality of sample optical flow cells 106.

In some embodiments, the detection system 100 includes a multichannel optical switch 112 with a fiber optic switch, and each EMR beam is generated from the single EMR source 110 in a millisecond range, for example, less than 50 milliseconds. In other examples, each EMR beam is generated from the single EMR source 110 in less than 40 milliseconds, less than 30 milliseconds, less than 20 milliseconds, or less than 10 milliseconds. In other examples, each EMR beam is generated from the single EMR source 110 in the range from about 10 milliseconds to about 50 milliseconds, or from about 20 milliseconds to about 50 milliseconds, or from about 30 milliseconds to about 40 milliseconds.

The detection system 100 includes a plurality of detectors 116 including, but not limited to, a photodiode detector, a photodiode array detector, a diode array detector, a photomultiplier tube, or a charge-couple device (CCD) detector.

In embodiments, the detection system 100 includes reference fluid and sample fluid which include aqueous liquid media, organic solvent liquid media, or combinations thereof. Examples of aqueous liquid media include, but are not limited to, water, organic buffers, inorganic buffers, cell culture media, or combinations thereof.

In some examples, the reference fluid and sample fluid are received to the reference optical flow cell 102 and the sample optical flow cell 106 at equivalent flow rates, different flow rates, or combinations thereof. For example, the reference fluid and biological sample are received at flow rates ranging from about 0.01 ml/hr to about 1 L/min. In some examples, the reference fluid and the sample fluid are received at flow rates ranging from about 0.01 mL/hr to about 1 L/min. For example, the flow rates can range from about 1 mL/min to about 5 mL/min, or from about 2 mL/min to about 5 mL/min or from about 1 ml/hr to about 100 mL/hour, or from about 1 mL/hour to about 500 mL/hr. In other examples, the reference fluid can be statically held in the reference optical flow cell 102.

In some embodiments, the sample fluid includes organic small-molecules, organic macromolecules, metal complexes, metal chelates, polymers, microparticles, nanoparticles, biological products, liposomes, lipid nanoparticles, exosomes, extracellular vesicles, membrane vesicles, cells, viruses, bacteria, capsids, virus-like particles, peptides, proteins, antibodies, antibody-drug conjugates, oligonucleotides, plasmids, mRNA, siRNA, RNAi, microRNA, adenoviruses, lentiviruses, adeno-associated viruses, oncolytic viruses, or combinations thereof. In examples, the sample fluid includes macromolecules (e.g., proteins, protein complexes, antibodies or antibody fragments)

In some embodiments, the detection system 100 described herein is configured to receive a sample from a flow-based or pressure driven flow-based apparatus. Exemplary apparatuses include those described in PCT Application Publication No. WO2022/056466 (International App. No. PCT/US21/50274) entitled "Process Technology for Biological Product Manufacturing and Downstream Purification," which is incorporated herein by reference in its entirety. For example, the flow-based or pressure driven flow-based apparatus is a free-flow electrophoresis apparatus. In other examples, the flow-based apparatus or pressure driven flow-based apparatus is a chromatography system.

The detection system 100 may be used to detect changes in a continuous flow of samples received from the flow-based or pressure drive flow-based apparatus to identify deviations in processing by the apparatus. For example, the detection system 100 may be used to monitor output from the flow-based or pressure drive flow-based apparatus and identify any deviations in the continuous sample received from the apparatus. If a deviation is identified, the detection system 100 may signal to the apparatus to stop further processing or to adjust processing parameters of the flow-based or pressure drive flow-based apparatus.

Methods

The methods described herein proved for detecting a property in a sample, for example, the property is detected in real-time during a purification and/or isolation process. For example, the methods provide for receiving a sample fluid (e.g., a heterogeneous mixture including a biological product such as an antibody) to a sample optical flow cell 106, receiving a reference fluid (e.g., a fluid comprising the media and not containing the biological product) to a reference optical flow cell 102. An electromagentic radiation beam is directed through each of the sample optical flow cells 106 and reference optical flow cells 102, detecting the transmitted, absorbed, or emitted EMR from the respective sample optical flow cell 106 and reference optical flow cell 102 continuously to thereby determine the property of the sample.

The property of the sample (e.g., the concentration of the biological product in the heterogeneous mixture) is determined using an internal calibration, where the system 100 further includes a continuous feedback loop derived from the reference optical flow cells 102. The internal calibration provides for accounting for the correction by the reference in real-time, e.g., baseline correction, spectral drift correction, EMR source degradation correction, EMR source power normalization, or any combinations therein.

In further aspects, provided herein are methods for detecting a property of at least one sample. The method includes receiving, via a sample inlet line 108, at least one sample fluid, to a sample optical flow cell 106, where the optical flow cell 106 has at least one optical interface coupler 114 to create an optical path orthogonal to the fluid path and simultaneously receiving, via a reference inlet line 104, at least one reference fluid, to a reference optical flow cell 102, wherein the reference optical flow cell 102 comprises at least one optical interface coupler 114 to create an optical path orthogonal to the fluid path; directing an electromagnetic radiation (EMR) beam through each of the sample optical flow cell 106 and the reference optical flow cell 102, wherein the beam originates from a single EMR source 110 and passes through a multichannel optical switch 112 comprising a fiber optic switch before being directed through each of the sample optical flow cell 106 and the reference optical flow cell 102; detecting EMR from each of the sample optical flow cell 106 and the reference optical flow cell 102, and determining a property of the sample, e.g., the concentration of the compound in the sample. In embodiments, the method further includes continuously determining a property of the sample through an algorithm or a computer-implemented method executed by the controller 118 based on measurements obtained by the detectors 116.

In further embodiments, the controller 118 is configured to perform internal calibration through a continuous feedback loop derived from the at least one or the plurality of reference optical flow cells 102 to provide baseline correction, spectral drift correction, EMR source degradation correction, EMR source power normalization, detector response normalization, or combinations thereof, in real-time.

In further aspects, provided herein are methods for detecting a property of at least one sample. The method includes receiving, via a sample inlet line 108, at least one sample fluid, to a sample optical flow cell 106, where the optical flow cell 106 has two optical interface couplers 114 to create an optical path orthogonal to the fluid path and simultaneously receiving, via a reference inlet line 104, at least one reference fluid, to a reference optical flow cell 102, wherein the reference optical flow cell 102 comprises two optical interface couplers 114 to create an optical path orthogonal to the fluid path; directing an EMR beam through each of the sample optical flow cell 106 and the reference optical flow cell 102, wherein the beam originates from a single EMR source 110 and passes through a multichannel optical switch 112 comprising a fiber optic switch before being directed through each of the sample optical flow cell 106 and the reference optical flow cell 102; detecting transmitted EMR from each of the sample optical flow cell 106 and the reference optical flow cell 102, and determining a property of the sample, e.g., the concentration of the compound in the sample. In embodiments, the method further includes continuously determining a property of the sample through an algorithm or a computer-implemented method executed by the controller 118 based on measurements obtained by the detectors 116.

In further embodiments, the controller 118 is configured to perform internal calibration through a continuous feedback loop derived from the at least one or the plurality of reference optical flow cells 102 to provide baseline correction, spectral drift correction, EMR source degradation correction, EMR source power normalization, detector response normalization, or combinations thereof, in real-time.

In-Line Absorption Spectroscopy Detection System

In further aspects, provided herein, inter alia, are systems and methods for spectroscopic compound analysis, including an in-line absorption spectroscopy detection system 200 that operates across the ultraviolet/visible/infrared (UV/Vis/IR) EMR spectrum. The in-line absorption spectroscopy detection system 200 and corresponding method is substantially similar to the exemplary multi-channel, in-line detection system 100 and associated method describe above, except as noted in the description below.

Figure 1B:
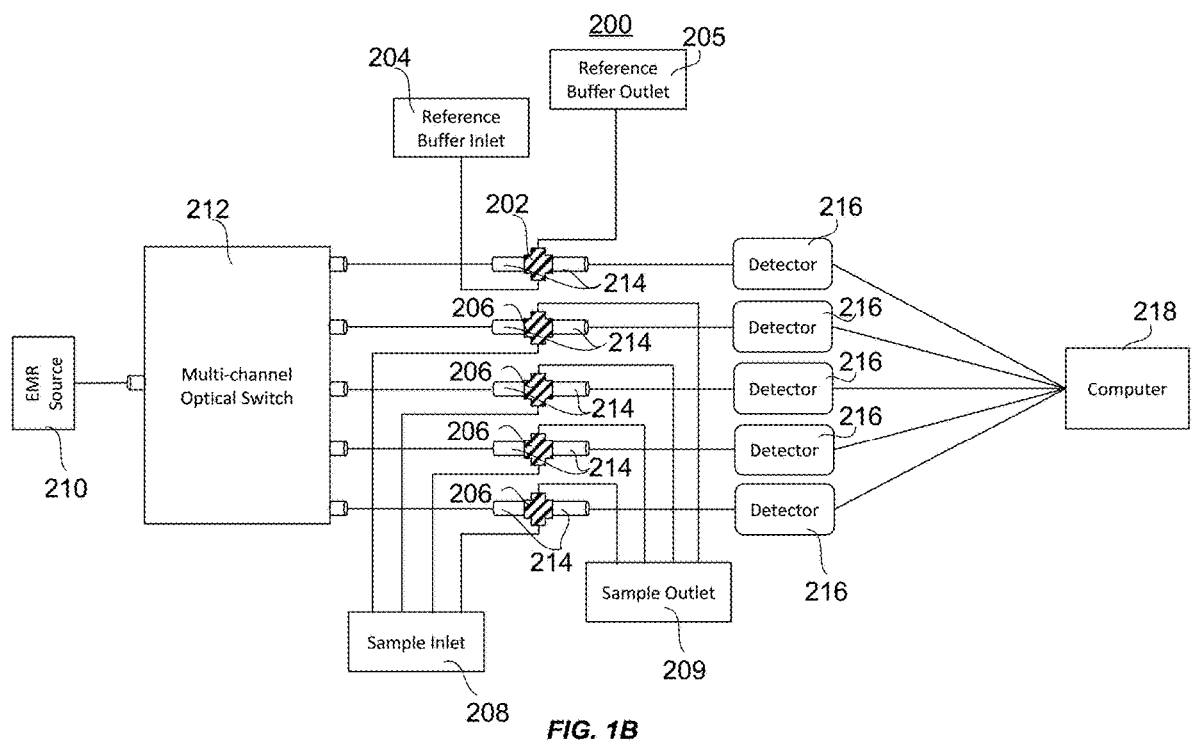
FIG. 1B is a schematic diagram of an exemplary multichannel, in-line absorption spectroscopy detection system (e.g., in-line UV detection system) comprising at least one opaque reference flow cell, at least one opaque sample flow cell, at least one detector, and a single electromagnetic radiation source.

FIG. 1B shows a schematic diagram of an exemplary multi-channel, in-line absorption spectroscopy detection system 200 comprising at least one opaque reference flow cell 202, at least one opaque sample flow cell 206, at least one detector 216, and a single electromagnetic radiation (EMR) source 210. In aspects, provided herein is a detection system 200 including at least one or a plurality of reference optical flow cells 202 configured to continuously receive a reference fluid; at least one or a plurality of sample optical flow cells 206 configured to continuously receive a sample; a single EMR source 210; a multichannel optical switch 212 configured to receive the EMR from the single EMR source 210; two optical interface couplers 214 per optical flow cells 202, 206; a plurality of detectors 216, each one of the plurality of detectors 216 configured to receive a EMR from each of the reference optical flow cells 202 and each of the sample optical flow cells 206; and a controller 218 operably coupled with the detectors 216 and configured to detect a property of the sample. The multichannel optical switch 212 includes a fiber optic switch, which is configured to generate a plurality of EMR beams from the single EMR source 210.

Each EMR beam is configured to pass through each of the reference optical flow cells 202 and sample optical flow cells 206.

The controller 218 is configured to detect a property in the sample, for example, the concentration of the compound in the sample. The controller 218 is further configured to perform an internal calibration through a continuous feedback loop, which is derived from the at least one or the plurality of reference optical flow cells 202. The internal calibration of the controller 218 provides for real time correction, including baseline correction, spectral drift correction, EMR source degradation correction, EMR source power normalization, detector response normalization, or any combinations thereof.

As provided herein, the single EMR source 210 includes a light emitting diode, a laser, a lamp, or a bulb. In embodiments, the single EMR source emits radiation having a wavelength ranging between 190-600 nm. In embodiments, the wavelength is between 190-500 nm, or between 190-400 nm, or between 190-300 nm. In some embodiments, the wavelength is 280 nm.

In embodiments, the system 200 includes a single EMR source 210, and the EMR source 210 emits a single wavelength, e.g., 280 nm (as a measurement for protein concentration).

In embodiments, the system 200 includes a single EMR source 210, and the EMR source 210 is collimated. The collimated EMR 210 (e.g., a guided beam of light) includes a guided EMR beam and allows for minimal spread of the EMR as it propagates.

The controller 218 may be further configured with an algorithm or a computer-implemented method executed by the controller 218 based on the transmitted EMR detected by the detectors 216 to determine a property of each sample flowing through each sample optical flow cell 206, such as concentration, or a change in properties in the continuous flow of sample.

In other aspects, the system 200 may be configured to correct for the detector gain differences or the output power from the single EMR source 210 (e.g., the laser or LED). For example, where the detector's gains are different, the system 200 is configured to transmit more power into a channel where the detector's 216 gains are lower. As the system 200 continues operation, changes in the single EMR source 210 power or full-width at half-maximum (FWHM) or changes in the optical interface due to contamination (e.g., adsorption phenomena) may be significant, which then the system 200 and methods for in-line absorption spectroscopy detection, as described herein accounts for with a feedback loop. For example, a feedback loop control executed by the controller 218 may be in place within the detection system 200, which accounts for degradation of the single EMR source 210 such that the same power is relayed into each fiber optic cable during continuous operation for long periods of time. The feedback loop may comprise a method executed by the controller 218 for configured to correct for the detector gain differences or the output power from the single EMR source 210.

The detection system 200 described herein has at least one or a plurality of reference optical flow cells 202 and at least one or a plurality of sample optical flow cells 206, each including two optical interface couplers 214 configured to create a discrete optical path orthogonal to the reference fluid or sample fluid. In some examples, the at least one or the plurality of reference optical flow cells 202 and the at least one or the plurality of sample optical flow cells 206 are opaque, optically opaque, or transparent. Moreover, the at least one or the plurality of reference optical flow cells 202 and the at least one or the plurality of sample optical flow cells 206 have an optical path length ranging from about 0.1 mm to about 10 cm. In other examples, the optical path length ranges from about 0.1 mm to 1 mm or about 1 to 10 mm. For example, the flow cells 202, 206 have an optical path length ranging from about 0.1 mm to about 1 mm, or from about 1 mm to about 5 mm, or from about 1 mm to about 10 mm, or from about 1 mm to about 15 mm, or from about 1 mm to about 20 mm. In further examples, the optical path length has a diameter from about 0.1 mm to about 10 mm. In embodiments, the path length is 5 mm. In embodiments, the path length is about 5 mm.

As described herein the detection system 200 includes at least one or a plurality of reference optical flow cells 202 that provide for a real-time internal calibration of the system 200. The real-time internal calibration is realized through a feedback loop control derived from the reference fluid. For example, the reference fluid is received by a continuous supply, by a re-circulated supply, or a statically held supply. As described above, the controller 218 is configured to perform an internal calibration through a continuous feedback loop, which is derived from the at least one or the plurality of reference optical flow cells 202. The internal calibration of the controller 218 provides for real time correction, including baseline correction, spectral drift correction, EMR source degradation correction, EMR source power normalization, detector response normalization, or any combinations thereof.

In embodiments, the detection system 200 includes a fiber optic cable configured from the single EMR source 210 to the multichannel optical switch 212. In embodiments, the detection system 200 includes fiber optic cables configured from the multichannel optical switch 212 to the plurality of flow cells 202, 206 via an optical interface coupler 214.

In embodiments, the fiber optic cables have a numerical aperture ranging from 0.1 to 0.6. In embodiments, the fiber optic cables of the detection system have a numerical aperture ranging from 0.1 to 0.6, or from 0.1 to 0.5, or from 0.1 to 0.4, or from 0.1 to 0.3, or from 0.1 to 0.2, or from 0.2 to 0.6, or from 0.2 to 0.5, or from 0.2 to 0.4, or from 0.2 to 0.3, or from 0.3 to 0.6, or from 0.3 to 0.5, or from 0.3 to 0.5. In embodiments, the numerical aperture is 0.22.

In embodiments, the detection system 200 described herein includes fiber optic cables that have core diameter ranging from 0.1 mm to 1 mm. In some embodiments, the detection system 200 includes fiber optic cables that have a core diameter ranging from about 0.1 mm to 1 mm, or from 0.1 mm to 0.5 mm, or from 0.1 mm to about 0.2 mm. In embodiments, the core diameter is 0.6 mm (600 µm).

In other embodiments, the detection system 200 includes a fiber optic switch that has at least one electromechanical switch to sequentially divert the EMR derived from the single EMR source to the at least one or the plurality of reference optical flow cells 202 and the at least one or the plurality of sample optical flow cells 206.

In some embodiments, the detection 200 system includes a multichannel optical switch 212 with a fiber optic switch, and each EMR beam is generated from the single EMR source 210 in a millisecond range, for example, less than 50 milliseconds. In other examples, each EMR beam is generated from the single EMR source 210 in less than 40 milliseconds, less than 30 milliseconds, less than 20 milliseconds, or less than 10 milliseconds. In other examples, each EMR beam is generated from the single EMR source 210 in the range from about 10 milliseconds to about 50 milliseconds, or from about 20 milliseconds to about 50 milliseconds, or from about 30 milliseconds to about 40 milliseconds.

In embodiments, the detection system 200 includes a plurality of detectors 216 including, but not limited to, a photodiode detector, a photodiode array detector, a diode array detector, a photomultiplier tube, or a charge-couple device (CCD) detector.

In embodiments, the detection system 200 includes a plurality of detectors 216 that further comprise at least one bandpass filter. In embodiments, the detection system 200 includes a plurality of detectors 216 that are configured to receive at least one EMR at at least one angle.

In embodiments, the detection system 200 includes reference fluid and sample fluid which include aqueous liquid media, organic solvent liquid media, or combinations thereof. Examples of aqueous liquid media include, but are not limited to, water, organic buffers, inorganic buffers, cell culture media, or combinations thereof.

In some examples, the reference fluid and sample fluid are received to the reference optical flow cell 202 and the sample optical flow cell 206 at equivalent flow rates, different flow rates, or combinations thereof. For example, the reference fluid and biological sample are received at flow rates ranging from about 0.01 mL/hr to about 1 L/min. In some examples, the reference fluid and the sample fluid are received at flow rates ranging from about 0.01 mL/hr to about 1 L/min. For example, the flow rates can range from about 1 mL/min to about 5 mL/min, or from about 2 mL/min to about 5 mL/min or from about 1 ml/hr to about 100 mL/hour, or from about 1 mL/hour to about 500 mL/hr. In other examples, the reference fluid can be statically held in the reference optical flow cell 202.

In some embodiments, the sample fluid includes organic small-molecules, organic macromolecules, metal complexes, metal chelates, polymers, microparticles, nanoparticles, biological products, liposomes, lipid nanoparticles, exosomes, extracellular vesicles, membrane vesicles, cells, viruses, bacteria, capsids, virus-like particles, peptides, proteins, antibodies, antibody-drug conjugates, oligonucleotides, plasmids, mRNA, siRNA, RNAi, microRNA, adenoviruses, lentiviruses, adeno-associated viruses, oncolytic viruses, or combinations thereof. In examples, the sample fluid includes macromolecules (e.g., proteins, protein complexes, antibodies or antibody fragments)

In some embodiments, the detection system 200 described herein is configured to receive a sample from a flow-based or pressure driven flow-based apparatus. Exemplary apparatuses include those described in PCT Application Publication No. WO2022/056466 (International App. No. PCT/US21/50274), which is incorporated herein by reference in its entirety. For example, the flow-based or pressure driven flow-based apparatus is a free-flow electrophoresis apparatus. In other examples, the flow-based apparatus or pressure driven flow-based apparatus is a chromatography system.

In further aspects, provided herein are methods for detecting a property of at least one sample using an in-line absorption spectroscopy detection system 200 that operates across the ultraviolet/visible/infrared (UV/Vis/IR) EMR spectrum. The method includes receiving, via a sample inlet line 208, at least one sample fluid, to a sample optical flow cell 206, where the optical flow cell 206 has two optical interface couplers 214 to create an optical path orthogonal to the fluid path and simultaneously receiving, via a reference inlet line 204, at least one reference fluid, to a reference optical flow cell 202, wherein the reference optical flow cell 202 comprises two optical interface couplers 214 to create an optical path orthogonal to the fluid path; directing an EMR beam through each of the sample optical flow cell 206 and the reference optical flow cell 202, wherein the beam originates from a single EMR source 210 and passes through a multichannel optical switch 212 comprising a fiber optic switch before being directed through each of the sample optical flow cell 206 and the reference optical flow cell 202; detecting transmitted EMR from each of the sample optical flow cell 206 and the reference optical flow cell 202, and determining a property of the sample, e.g., the concentration of the compound in the sample. In further embodiments, the controller 218 is configured to perform internal calibration through a continuous feedback loop derived from the plurality of reference optical flow cells 202 to provide baseline correction, spectral drift correction, EMR source degradation correction, EMR source power normalization, detector response normalization, or combinations thereof, in real-time.

In further aspects, provided herein is an in-line, absorption spectroscopy detection system 200, including at least one or a plurality of reference optical flow cells 202 configured to continuously receive a reference fluid; at least one or a plurality of sample optical flow cells 206 configured to continuously receive a sample; a single electromagnetic radiation (EMR) source 210; two optical interface couplers 214 per optical flow cell 202, 206; a multichannel optical switch 212 configured to receive the EMR from the single EMR source 210, the multichannel optical switch 212 comprising a fiber optic switch configured to generate a plurality of EMR beams from the single EMR source 210, wherein each EMR beam is configured to pass through each of the reference optical flow cells 202 and the sample optical flow cells 206; a plurality of detectors 216, each one of the plurality of detectors 216 configured to receive a transmitted EMR from one of the reference optical flow cells 202 and the sample optical flow cells 206; and a controller 218 operably coupled with the plurality of detectors 216 and configured to continuously detect the concentration of the sample in each of the optical flow cells 202, 206.

The detection system 200 may be used to detect changes in a continuous flow of samples received from the flow-based or pressure drive flow-based apparatus to identify deviations in processing by the apparatus. For example, the detection system 200 may be used to monitor output from the flow-based or pressure drive flow-based apparatus and identify any deviations in the continuous sample received from the apparatus. If a deviation is identified, the detection system 200 may signal to the apparatus to stop further processing or to adjust processing parameters of the flow-based or pressure drive flow-based apparatus.

In other aspects, the system is configured to correct for the detector gain differences or the output power from the single EMR source (e.g., the laser or LED). For example, where the detector's gains are different, the system is configured to transmit more power into a channel where the detector's gains are lower. As the system continues operation, changes in the single EMR source power or full-width at half-maximum (FWHM) may be significant, which then the system and methods, as described herein accounts for with a feedback loop. For example, a feedback loop control mechanism is in place within the detections system, which accounts for degradation of the single EMR source such that the same power is relayed into each fiber optic cable during continuous operation for long periods of time. The feedback loop is run by a software algorithm signaling to the EMR source.

The single EMR source (e.g., LED, laser, etc.) generates a single wavelength that is transmitted via fiber optic cable into an electromechanical switch that allows the EMR beam to go to multiple sample optical flow cells with a single reference optical flow cell. In this way, both the sample and the reference are always interrogated by an EMR beam having the same properties, and every detector of the system detects EMR having the same properties. Put another way, the electromechanical switch is a means to split the fiber optic cable input into multiple equivalent outputs. For example, as disclosed herein, the system includes 12 optical switch outputs, wherein at least one is connected to a reference optical flow cell and the remaining outputs may be connected to up to 10 sample optical flow cells comprising process sample liquid derived from 10 outlets of a Free-Flow Electrophoresis system (PCT Application Publication No. WO2022/056466 (International App. No. PCT/US21/50274)) for continuous process sample monitoring. In other embodiments of the system, the system can include any number of switch outputs, for example, in addition to the reference, the number of switch outputs can include two optical switch outputs, three optical switch outputs, four optical switch outputs, five optical switch outputs, six optical switch outputs, seven optical switch outputs, eight optical switch outputs, nine optical switch outputs, ten optical switch outputs, or eleven optical switch outputs In some embodiments, the detection system includes a multichannel optical switch with at least one fiber optic switch to divert the single, incident EMR beam into discrete, equivalent outputs with a time delay in the millisecond range, for example, less than 50 milliseconds. For example, the time delay is less than 50 milliseconds, or about 50 milliseconds, or about 20 to 50 milliseconds, or about 50 milliseconds to 100 milliseconds.

While the PendoTech in-line UV absorbance system provides single use, in-line sample monitoring, it does not address the need for a reference cell, and thus, this system cannot address problems arising from (1) spectral drift correction, (2) light source degradation correction, (3) baseline correction, and (4) detector fluctuations and variability. Current benchtop spectroscopy systems, including, a traditional double beam UV spectrometer that has (1) an optical path defined by a static cuvette (2) a EMR wavelength that is selected by a diffraction grating (3) mirrors to direct the beam into different locations for continuous interrogation of a reference liquid and a sample from a single EMR source, only allows offline or at-line sampling for interrupted process monitoring. Current benchtop technologies utilize a sample and a reference cell, however with static cuvettes and intermittent sampling. The instant disclosure addresses these limitations by incorporating in-line flow cells rather than static cuvettes (e.g., for a static system), which allows for a liquid to continuously move through the system to enable continuous process monitoring. The instant disclosure turns a benchtop double beam UV spectrometer into an in-line monitoring system that can analyze samples that are in motion (e.g., continuous) with in-line reference and sample flow cells to maintain the benefits of the double beam design—specifically, (1) spectral drift correction, (2) light source degradation correction, (3) baseline correction, and (4) detector fluctuations and variability. The instant system transforms a traditional benchtop double beam UV spectrometer into a continuous, in-line monitoring system.

In-Line Fluorescence Spectroscopy Detection System

In further aspects, provided herein, inter alia, are systems and methods for spectroscopic compound analysis, including an in-line fluorescence spectroscopy detection system 300. The in-line fluorescence spectroscopy detection system 300 and corresponding method is substantially similar to the exemplary multi-channel, in-line detection system 100 and associated method describe above, except as noted in the description below.

Figure 1C:
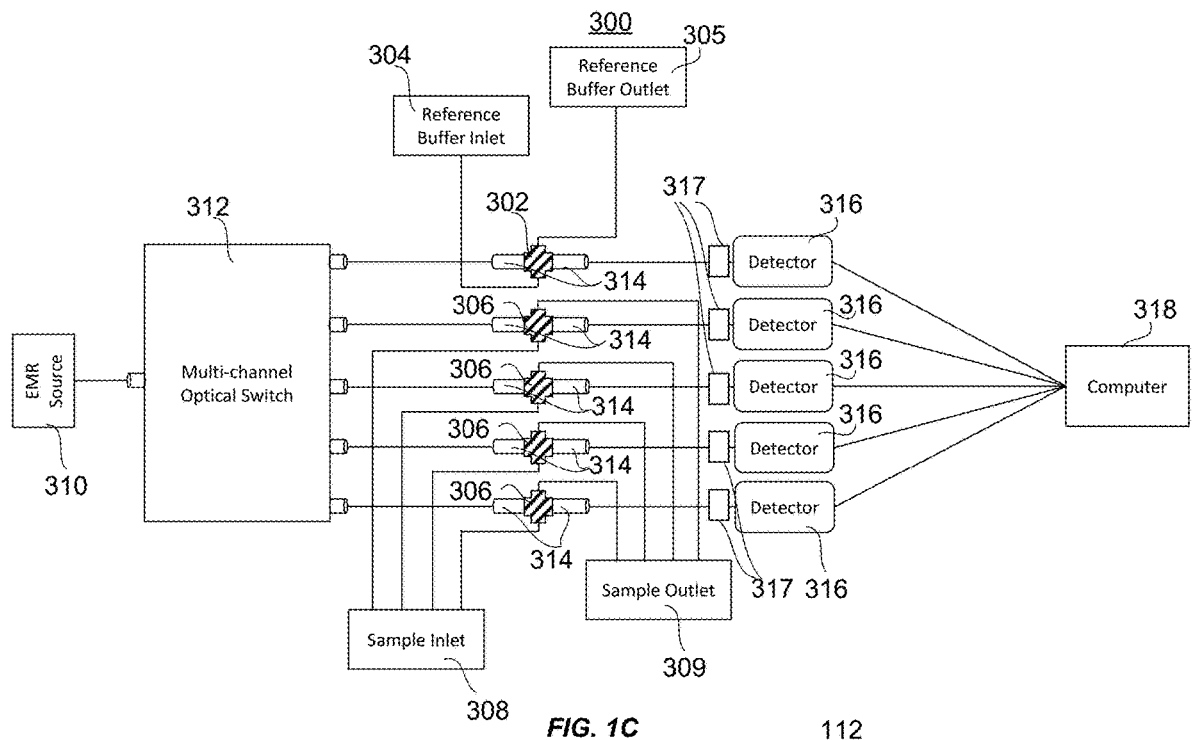
FIG. 1C is a schematic diagram of an exemplary multichannel, in-line fluorescence spectroscopy detection system comprising at least one opaque reference flow cell, at least one opaque sample flow cell, at least one detector with a bandpass filter, and a single electromagnetic radiation source.

FIG. 1C is a schematic diagram of an exemplary multi-channel, in-line fluorescence spectroscopy detection system 300 comprising at least one opaque reference flow cell 302, at least one opaque sample flow cell 306, at least one detector 316 with a bandpass filter 317, and a single electromagnetic radiation source 310.

In aspects, provided herein is a detection system 300 including at least one or a plurality of reference optical flow cells 302 configured to continuously receive a reference fluid; at least one or a plurality of sample optical flow cells 306 configured to continuously receive a sample; a single EMR source 310; a multichannel optical switch 312 configured to receive the EMR from the single EMR source 310; two optical interface couplers 314 per optical flow cells 302, 306; a plurality of detectors 316 comprising at least one bandpass filter, each one of the plurality of detectors 316 configured to receive a EMR from each of the reference optical flow cells 302 and plurality of sample optical flow cells 306; and a controller 318 operably coupled with the detectors 316 and configured to detect a property of the sample. The multichannel optical switch 312 includes a fiber optic switch, which is configured to generate a plurality of EMR beams from the single EMR source 310. Each EMR beam is configured to pass through each of the reference optical flow cells 302 and plurality of sample optical flow cells 306.

The controller 318 is configured to detect a property in the sample, for example, the concentration of the compound in the sample. The controller 318 is further configured to perform an internal calibration through a continuous feedback loop, which is derived from the at least one or the plurality of reference optical flow cells 302. The internal calibration of the controller 318 provides for real time correction, including baseline correction, spectral drift correction, EMR source degradation correction, EMR source power normalization, detector response normalization, or any combinations thereof.

As provided herein, the single EMR source 310 includes a light emitting diode, a laser, a lamp, or a bulb. In embodiments, the single EMR source 310 emits radiation having a wavelength ranging between 190-600 nm. In embodiments, the wavelength is between 190-500 nm, or between 190-400 nm, or between 190-300 nm. In some embodiments, the wavelength is 280 nm.

In embodiments, the system includes a single EMR source 310, and the EMR source 310 emits a single wavelength, e.g., 280 nm (as a measurement for protein concentration). In some embodiments, the system 300 includes a single EMR source 310 the EMR source is tunable.

In embodiments, the system 300 includes a single EMR source 310, and the EMR source 310 is collimated. The collimated EMR (e.g., a guided beam of light) includes a guided EMR beam and allows for minimal spread of the EMR as it propagates.

The controller 318 may be further configured with an algorithm or a computer-implemented method executed by the controller 318 based on the transmitted EMR detected by the detectors 316 to determine a property of each sample flowing through each sample optical flow cell 306, such as concentration, or a change in properties in the continuous flow of sample.

In other aspects, the system 300 may be configured to correct for the detector gain differences or the output power from the single EMR source 310 (e.g., the laser or LED). For example, where the detector's gains are different, the system 300 is configured to transmit more power into a channel where the detector's 316 gains are lower. As the system 300 continues operation, changes in the single EMR source 310 power or full-width at half-maximum (FWHM) or changes in the optical interface due to contamination (e.g., adsorption phenomena) may be significant, which then the system 300 and methods for in-line absorption spectroscopy detection, as described herein accounts for with a feedback loop. For example, a feedback loop control executed by the controller 318 may be in place within the detection system 300, which accounts for degradation of the single EMR source 310 such that the same power is relayed into each fiber optic cable during continuous operation for long periods of time. The feedback loop may comprise a method executed by the controller 318 for configured to correct for the detector gain differences or the output power from the single EMR source 310.

The detection system 316 described herein has at least one or a plurality of reference optical flow cells 302 and the at least one or a plurality of sample optical flow cells 306, each including two optical interface couplers 314 configured to create a discrete optical path orthogonal to the reference fluid or sample fluid. In some examples, the at least one or the plurality of reference optical flow cells 302 and the at least one or the plurality of sample optical flow cells 306 are opaque. Moreover, the at least one or the plurality of reference optical flow cells 302 and the at least one or the plurality of sample optical flow cells 306 have an optical path length ranging from about 0.1 mm to about 10 cm. In other examples, the optical path length ranges from about 0.1 mm to 1 mm or about 1 to 10 mm. For example, the flow cells 302, 306 have an optical path length ranging from about 0.1 mm to about 1 mm, or from about 1 mm to about 5 mm, or from about 1 mm to about 10 mm, or from about 1 mm to about 15 mm, or from about 1 mm to about 20 mm. In further examples, the optical path length has a diameter from about 0.1 mm to about 10 mm. In embodiments, the path length is 5 mm. In embodiments, the path length is about 5 mm.

As described herein the detection system 300 includes at least one or a plurality of reference optical flow cells 302 that provide for a real-time internal calibration of the system. The real-time internal calibration is realized through a feedback loop control derived from the reference fluid. For example, the reference fluid is received by a continuous supply, by a re-circulated supply, a statically held supply. As described above, the controller 318 is configured to perform an internal calibration through a continuous feedback loop, which is derived from the at least one or the plurality of reference optical flow cells 302. The internal calibration of the controller 318 provides for real time correction, including baseline correction, spectral drift correction, EMR source degradation correction, EMR source power normalization, detector response normalization, or any combinations thereof.

In embodiments, the detection system 300 includes a fiber optic cable configured from the single EMR source 310 to the multichannel optical switch 312. In embodiments, the detection system 300 includes fiber optic cables configured from the multichannel optical switch 312 to the plurality of flow cells 302, 306 via an optical interface coupler.

In embodiments, the fiber optic cables have a numerical aperture ranging from 0.1 to 0.6. In embodiments, the fiber optic cables of the detection system have a numerical aperture ranging from 0.1 to 0.6, or from 0.1 to 0.5, or from 0.1 to 0.4, or from 0.1 to 0.3, or from 0.1 to 0.2, or from 0.2 to 0.6, or from 0.2 to 0.5, or from 0.2 to 0.4, or from 0.2 to 0.3, or from 0.3 to 0.6, or from 0.3 to 0.5, or from 0.3 to 0.5. In embodiments, the numerical aperture is 0.22.

In embodiments, the detection system 300 described herein includes fiber optic cables that have core diameter ranging from 0.1 mm to 1 mm. In some embodiments, the detection system 300 includes fiber optic cables that have a core diameter ranging from about 0.1 mm to 1 mm, or from 0.1 mm to 0.5 mm, or from 0.1 mm to about 0.2 mm. In embodiments, the core diameter is 0.6 mm (600 µm).

In other embodiments, the detection system 300 includes a fiber optic switch that has at least one electromechanical switch to sequentially divert the EMR derived from the single light source to the at least one or the plurality of reference optical flow cells 302 and the at least one or the plurality of sample optical flow cells 306.

In some embodiments, the detection system 300 includes a multichannel optical switch 312 with a fiber optic switch, and each EMR beam is generated from the single EMR source 310 in a millisecond range, for example, less than 50 milliseconds. In other embodiments, each EMR beam is generated from the single EMR source 310 in less than 40 milliseconds, less than 30 milliseconds, less than 20 milliseconds, or less than 10 milliseconds. In other examples, each EMR beam is generated from the single EMR source 310 in the range from about 10 milliseconds to about 50 milliseconds, or from about 20 milliseconds to about 50 milliseconds, or from about 30 milliseconds to about 40 milliseconds.

The detection system 300 includes a plurality of detectors 316 including, but not limited to, a photodiode detector, a photodiode array detector, a diode array detector, a photomultiplier tube, or a charge-couple device (CCD) detector. In examples, the detection system 300 further includes a bandpass filter to select a discrete wavelength range of emitted EMR.

In embodiments, the detection system 300 includes reference fluid and sample fluid which include aqueous liquid media, organic solvent liquid media, or combinations thereof. Examples of aqueous liquid media include, but are not limited to, water, organic buffers, inorganic buffers, cell culture media, or combinations thereof.

In some examples, the reference fluid and sample fluid are received to the reference optical flow cell 302 and the sample optical flow cell 306 at equivalent flow rates, different flow rates, or combinations thereof. For example, the reference fluid and biological sample are received at flow rates ranging from about 0.01 ml/hr to about 1 L/min. In some examples, the reference fluid and the sample fluid are received at flow rates ranging from about 0.01 mL/hr to about 1 L/min. For example, the flow rates can range from about 1 mL/min to about 5 mL/min, or from about 2 mL/min to about 5 mL/min or from about 1mL/hr to about 100 mL/hour, or from about 1 mL/hour to about 500 mL/hr. In other examples, the reference fluid can be statically held in the reference optical flow cell.

In some embodiments, the sample fluid includes organic small-molecules, organic macromolecules, metal complexes, metal chelates, polymers, microparticles, nanoparticles, biological products, liposomes, lipid nanoparticles, exosomes, extracellular vesicles, membrane vesicles, cells, viruses, bacteria, capsids, virus-like particles, peptides, proteins, antibodies, antibody-drug conjugates, oligonucleotides, plasmids, mRNA, siRNA, RNAi, microRNA, adenoviruses, lentiviruses, adeno-associated viruses, oncolytic viruses, or combinations thereof. In examples, the sample fluid includes macromolecules (e.g., proteins, protein complexes, antibodies or antibody fragments)

In some embodiments, the detection system 300 described herein is configured to receive a sample from a flow-based or pressure driven flow-based apparatus. Exemplary apparatuses include those described PCT Application Publication No. WO2022/056466 (International App. No. PCT/US21/50274), which is incorporated herein by reference in its entirety. For example, the flow-based or pressure driven flow-based apparatus is a free-flow electrophoresis apparatus. In other examples, the flow-based apparatus or pressure driven flow-based apparatus is a chromatography system.

In further aspects, provided herein are methods for detecting a property of at least one sample using an in-line fluorescence spectroscopy detection system 300. The method includes receiving, via a sample inlet line 308, at least one sample fluid, to a sample optical flow cell 306, where the sample optical flow cell 306 has two optical interface couplers 314 to create an optical path orthogonal to the fluid path and simultaneously receiving, via a reference inlet line 304, at least one reference fluid, to a reference optical flow cell 302, wherein the reference optical flow cell 302 comprises two optical interface couplers 314 to create an optical path orthogonal to the fluid path; directing an EMR beam through each of the sample optical flow cell 306 and the reference optical flow cell 302, wherein the beam originates from a single EMR source 310 and passes through a multichannel optical switch 312 comprising a fiber optic switch before being directed through each of the sample optical flow cell 306 and the reference optical flow cell 302; detecting emitted EMR from each of the sample optical flow cell 306 and the reference optical flow cell 302, and determining a property of the sample, e.g., the concentration of the compound in the sample. In further embodiments, the controller 318 is configured to perform internal calibration through a continuous feedback loop derived from the at least one or the plurality of reference optical flow cells 302 to provide baseline correction, spectral drift correction, EMR source degradation correction, EMR source power normalization, detector response normalization, or combinations thereof, in real-time.

In aspects, provided herein is in-line, fluorescence spectroscopy detection system 300, including at least one or a plurality of reference optical flow cells 302 configured to continuously receive a reference fluid; at least one or a plurality of sample optical flow cells 306 configured to continuously receive a sample; a single electromagnetic radiation (EMR) source 310; two optical interface couplers 314 per optical flow cell 302, 306; a multichannel optical switch 312 configured to receive the EMR from the single EMR source 310, the multichannel optical switch 312 comprising a fiber optic switch configured to generate a plurality of EMR beams from the single EMR source 310, wherein each EMR beam is configured to pass through each of the at least one or a plurality of the reference optical flow cells 302 and the at least one or plurality of sample optical flow cells 306; a plurality of detectors comprising at least one band pass filter 316, each one of the plurality of detectors 316 configured to receive a transmitted EMR from one of the reference optical flow cells 302 and plurality of sample optical flow cells 306; at least one bandpass filter; and a controller 318 operably coupled with the plurality of detectors 316 and configured to continuously detect the concentration of the sample in each of the optical flow cells 302, 306.

The detection system 300 may be used to detect changes in a continuous flow of samples received from the flow-based or pressure drive flow-based apparatus to identify deviations in processing by the apparatus. For example, the detection system 300 may be used to monitor output from the flow-based or pressure drive flow-based apparatus and identify any deviations in the continuous sample received from the apparatus. If a deviation is identified, the detection system 300 may signal to the apparatus to stop further processing or to adjust processing parameters of the flow-based or pressure drive flow-based apparatus.

In other aspects, the system is configured to correct for the detector gain differences or the output power from the single EMR source (e.g., the laser or LED). For example, where the detector's gains are different, the system is configured to transmit more power into a channel where the detector's gains are lower. As the system continues operation, changes in the single EMR source power or full-width at half-maximum (FWHM) may be significant, which then the system and methods, as described herein accounts for with a feedback loop. For example, a feedback loop control mechanism is in place within the detections system, which accounts for degradation of the single EMR source such that the same power is relayed into each fiber optic cable during continuous operation for long periods of time. The feedback loop is run by a software algorithm signaling to the EMR source.

The single EMR source (e.g., LED, laser, etc.) generates a single wavelength that is transmitted via fiber optic cable into an electromechanical switch that allows the EMR beam to go to multiple sample optical flow cells with a single reference optical flow cell. In this way, both the sample and the reference are always interrogated by an EMR beam having the same properties, and every detector of the system detects EMR having the same properties. Put another way, the electromechanical switch is a means to split the fiber optic cable input into multiple equivalent outputs. For example, as disclosed herein, the system includes 12 optical switch outputs, wherein at least one is connected to a reference optical flow cell and the remaining outputs may be connected to up to 10 sample optical flow cells comprising process sample liquid derived from 10 outlets of a Free-Flow Electrophoresis system (PCT Application Publication No. WO2022/056466 (International App. No. PCT/US21/50274)) for continuous process sample monitoring. In other embodiments of the system, the system can include any number of switch outputs, for example, in addition to the reference, the number of switch outputs can include two optical switch outputs, three optical switch outputs, four optical switch outputs, five optical switch outputs, six optical switch outputs, seven optical switch outputs, eight optical switch outputs, nine optical switch outputs, ten optical switch outputs, or eleven optical switch outputs In some embodiments, the detection system includes a multichannel optical switch with at least one fiber optic switch to divert the single, incident EMR beam into discrete, equivalent outputs with a time delay in the millisecond range, for example, less than 50 milliseconds. For example, the time delay is less than 50 milliseconds, or about 50 milliseconds, or about 20 to 50 milliseconds, or about 50 milliseconds to 100 milliseconds.

In-Line Multi-Angle Light Scattering (MALS) Detection System

Figure 7:
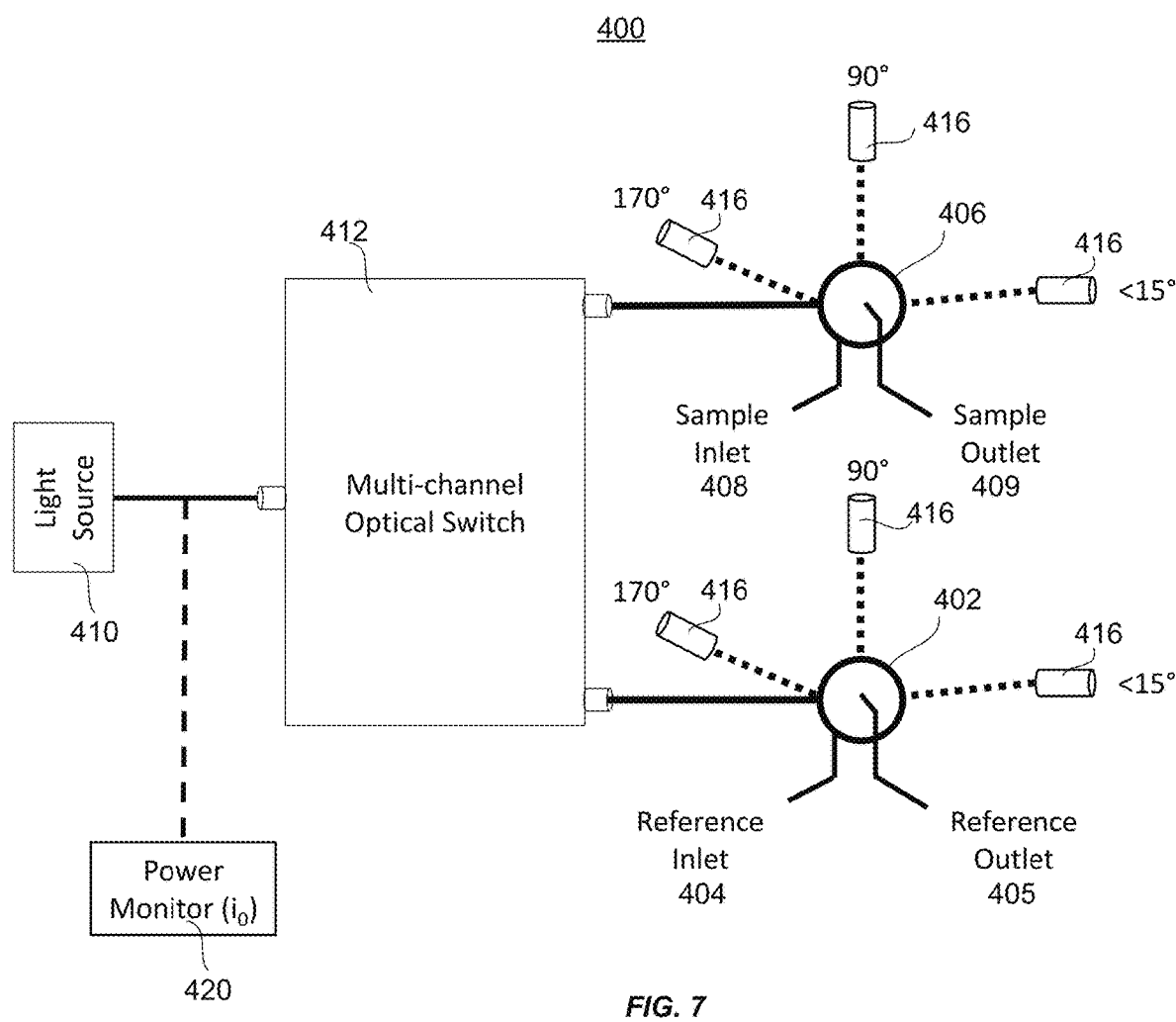
FIG. 7 is a schematic diagram of an exemplary multichannel, in-line MALS detection system comprising at least one optically transparent reference flow cell, at least one optically transparent sample flow cell, a plurality of detectors, and a single electromagnetic radiation source.
Figure 8:
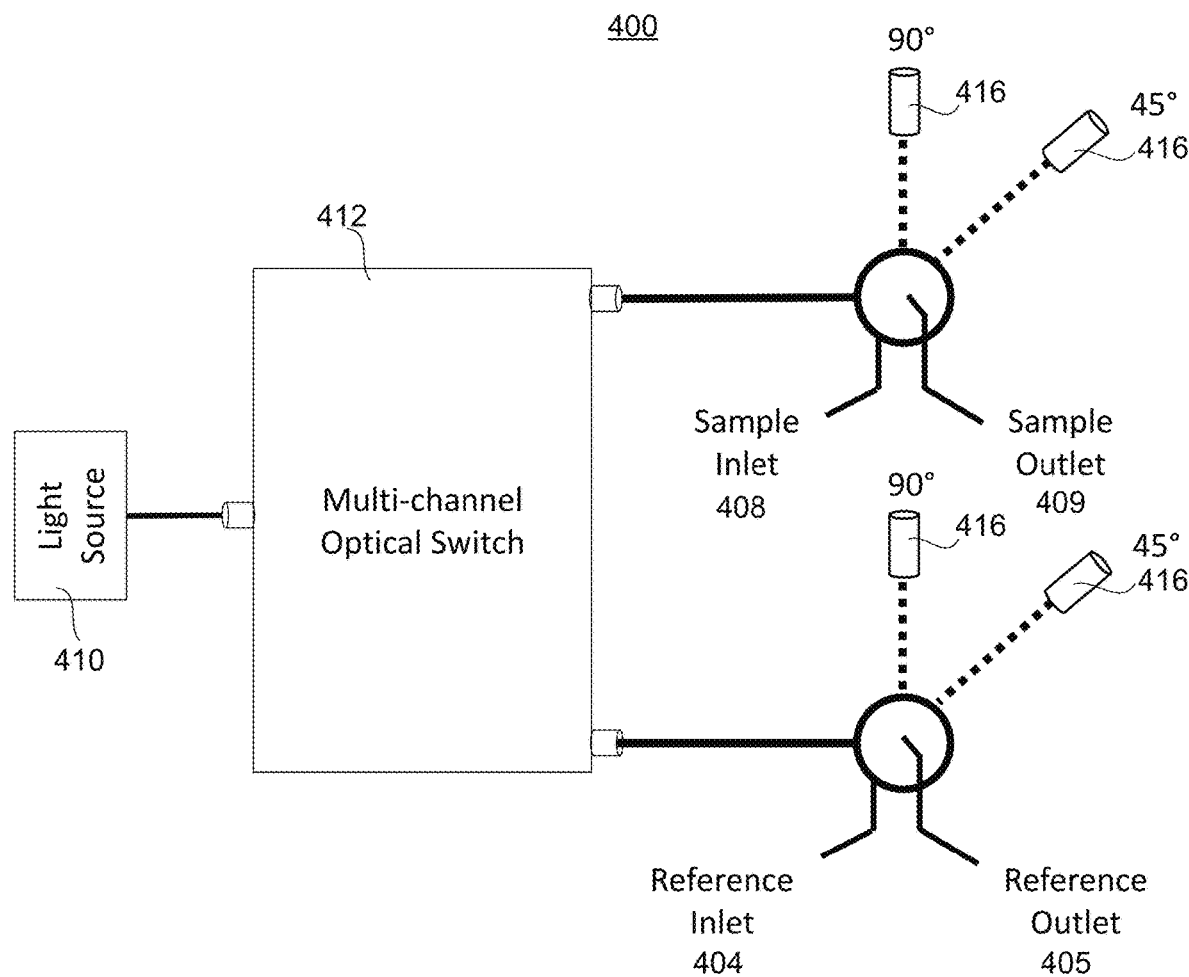
FIG. 8 is a schematic diagram of an exemplary multi-channel, in-line MALS detection system comprising at least one optically transparent reference flow cell, at least one optically transparent sample flow cell, a plurality of detectors, and a single electromagnetic radiation source, without a power monitor to measure incident intensity ($I_0$).

In further aspects, provided herein, inter alia, are systems and methods for spectroscopic compound analysis, including an in-line multi-angle light scattering (MALS) detection system 400. FIGS. 7 and 8 show schematic diagram of exemplary multi-channel, in-line MALS detection systems 400 comprising at least one optically transparent reference flow cell 402, at least one optically transparent sample flow cell 406, a plurality of detectors 416, and a single electromagnetic radiation source 410. As shown in FIG. 7, the MALS detection system 400 may also include a power monitor 420 to measure incident intensity ($I_0$). Alternatively, as shown in FIG. 8, the MALS detection system 400 may be without a power monitor to measure incident intensity ($I_0$).

In aspects, provided herein is a detection system including at least one or a plurality of reference optical flow cells configured to continuously receive a reference fluid; at least one or a plurality of sample optical flow cells configured to continuously receive a sample; a single EMR source; a multichannel optical switch configured to receive the EMR from the single EMR source; two optical interface couplers per optical flow cells; a plurality of detectors, each one of the plurality of detectors configured to receive a EMR from each of the reference optical flow cells and sample optical flow cells; and a controller operably coupled with the detectors and configured to detect a property of the sample. The multichannel optical switch includes a fiber optic switch, which is configured to generate a plurality of EMR beams from the single EMR source. Each EMR beam is configured to pass through each of the plurality of the reference optical flow cells and plurality of sample optical flow cells.

The controller is configured to detect a property in the sample, for example, the concentration of the compound in the sample. The controller is further configured to perform an internal calibration through a continuous feedback loop, which is derived from the plurality of reference optical flow cells. The internal calibration of the controller provides for real time correction, including baseline correction, spectral drift correction, EMR source degradation correction, EMR source power normalization, detector response normalization, or any combinations thereof.

As provided herein, the single EMR source includes a light emitting diode, a laser, a lamp, or a bulb. In embodiments, the single EMR source emits radiation having a wavelength ranging between 500 and 700 nm. In some embodiments, the wavelength is 650 nm.

In embodiments, the system includes a single EMR source, and the EMR source emits a single wavelength, e.g., 650 nm (as a measurement for particle size).

In embodiments, the system includes a single EMR source, and the EMR source is collimated. The collimated EMR (e.g., a guided beam of light) includes a guided EMR beam and allows for minimal spread of the EMR as it propagates.

The detection system described herein has at least one or a plurality of reference optical flow cells and at least one or a plurality of sample optical flow cells, each including at least one optical interface coupler configured to create a discrete optical path orthogonal to the reference fluid or sample fluid. In some examples, the plurality of reference optical flow cells and the plurality of sample optical flow cells are transparent. Moreover, the plurality of reference optical flow cells and the plurality of sample optical flow cells have an optical path length ranging from about 0.1 mm to about 10 cm. In other examples, the optical path length ranges from about 0.1 mm to 1 mm or about 1 to 10 mm. For example, the flow cells have an optical path length ranging from about 0.1 mm to about 1 mm, or from about 1 mm to about 5 mm, or from about 1 mm to about 10 mm, or from about 1 mm to about 15 mm, or from about 1 mm to about 20 mm. In further examples, the optical path length has a diameter from about 0.1 mm to about 10 mm. In embodiments, the path length is 5 mm. In embodiments, the path length is about 5 mm.

As described herein the detection system includes a plurality of reference optical flow cells that provide for a real-time internal calibration of the system. The real-time internal calibration is realized through a feedback loop control derived from the reference fluid. For example, the reference fluid is received by a continuous supply, by a re-circulated supply, a statically held supply. As described above, the controller is configured to perform an internal calibration through a continuous feedback loop, which is derived from the plurality of reference optical flow cells. The internal calibration of the controller provides for real time correction, including baseline correction, spectral drift correction, EMR source degradation correction, EMR source power normalization, detector response normalization, or any combinations thereof.

In embodiments, the detection system includes a fiber optic cable configured from the single EMR source to the multichannel optical switch. In embodiments, the detection system includes fiber optic cables configured from the multichannel optical switch to the plurality of flow cells via an optical interface coupler.

In embodiments, the fiber optic cables have a numerical aperture ranging from 0.1 to 0.6. In embodiments, the fiber optic cables of the detection system have a numerical aperture ranging from 0.1 to 0.6, or from 0.1 to 0.5, or from 0.1 to 0.4, or from 0.1 to 0.3, or from 0.1 to 0.2, or from 0.2 to 0.6, or from 0.2 to 0.5, or from 0.2 to 0.4, or from 0.2 to 0.3, or from 0.3 to 0.6, or from 0.3 to 0.5, or from 0.3 to 0.5. In embodiments, the numerical aperture is 0.22.

In embodiments, the detection system described herein includes fiber optic cables that have core diameter ranging from 0.1 mm to 1 mm. In some embodiments, the detection system includes fiber optic cables that have a core diameter ranging from about 0.1 mm to 1 mm, or from 0.1 mm to 0.5 mm, or from 0.1 mm to about 0.2 mm. In embodiments, the core diameter is 0.6 mm (600 μm).

In other embodiments, the detection system includes a fiber optic switch that has at least one electromechanical switch to sequentially divert the EMR derived from the single EMR source to the plurality of reference optical flow cells and the plurality of sample optical flow cells.

In some embodiments, the detection system includes a multichannel optical switch with a fiber optic switch, and each EMR beam is generated from the single EMR source in a millisecond range, for example, less than 50 milliseconds. In other examples, each EMR beam is generated from the single EMR source in less than 40 milliseconds, less than 30 milliseconds, less than 20 milliseconds, or less than 10 milliseconds. In other examples, each EMR beam is generated from the single EMR source in the range from about 10 milliseconds to about 50 milliseconds, or from about 20 milliseconds to about 50 milliseconds, or from about 30 milliseconds to about 40 milliseconds.

In embodiments, the detection system includes a plurality of detectors including, but not limited to, a photodiode detector, a photodiode array detector, a diode array detector, a photomultiplier tube, or a charge-couple device (CCD) detector. In some embodiments, the plurality of detectors is positioned at a plurality of discrete angles to the incident EMR beam to receive transmitted EMR, scattered EMR, or combinations thereof. In examples, the detector angles are selected from <15°, 45°, 90°, 170°, 270°, or combinations thereof. In some examples, detectors positioned at 90° and 45°, to the incident EMR beam provide determination of sample particle size. In embodiments, the detector system includes two detectors. In embodiments, the two detectors are positioned at different angles. For example, the detectors are positioned at 45° and 170° to the incident beam, or 45° and 270° to the incident beam, or 45° and <15° to the incident beam, or 90° and <15° to the incident beam, or 90° and 170° to the incident beam, or 90° and 270° to the incident beam, or 170° and 270° to the incident beam. In some embodiments, the two detectors are positioned at 45° and 90° to the incident beam.

In embodiments, the detection system includes reference fluid and sample fluid which include aqueous liquid media, organic solvent liquid media, or combinations thereof. Examples of aqueous liquid media include, but are not limited to, water, organic buffers, inorganic buffers, cell culture media, or combinations thereof.

In some examples, the reference fluid and sample fluid are received to the reference optical flow cell and the sample optical flow cell at equivalent flow rates, different flow rates, or combinations thereof. For example, the reference fluid and biological sample are received at flow rates ranging from about 0.01 mL/hr to about 1 L/min. In some examples, the reference fluid and the sample fluid are received at flow rates ranging from about 0.01 mL/hr to about 1 L/min. For example, the flow rates can range from about 1 mL/min to about 5 mL/min, or from about 2 mL/min to about 5 mL/min or from about 1 mL/hr to about 100 mL/hour, or from about 1 mL/hour to about 500 mL/hr. In other examples, the reference fluid can be statically held in the reference optical flow cell.

In some embodiments, the sample fluid includes particulates, microparticles, nanoparticles, biological products, protein aggregates, liposomes, lipid nanoparticles, exosomes, extracellular vesicles, membrane vesicles, cells, viruses, bacteria, capsids, virus-like particles, adenoviruses, lentiviruses, adeno-associated viruses, oncolytic viruses, or combinations thereof.

In some embodiments, the detection system described herein is configured to receive a sample from a flow-based or pressure driven flow-based apparatus. Exemplary apparatuses include those described in PCT Application Publication No. WO2022/056466 (International App. No. PCT/US21/50274) entitled "Process Technology for Biological Product Manufacturing and Downstream Purification," which is incorporated herein by reference in its entirety. For example, the flow-based or pressure driven flow-based apparatus is a free-flow electrophoresis apparatus. In some examples, the flow-based apparatus or pressure driven flow-based apparatus is a chromatography system. In other examples, the flow-based apparatus or pressure driven flow-based apparatus is an in-line absorption spectroscopy system capable of providing a sample concentration.

In further aspects, provided herein are methods for detecting a property of at least one sample. The method includes receiving, via a sample inlet line, at least one sample fluid, to a sample optical flow cell, where the optical flow cell has at least one optical interface coupler to create an optical path orthogonal to the fluid path and simultaneously receiving, via a reference inlet line, at least one reference fluid, to a reference optical flow cell, wherein the reference optical flow cell comprises at least one optical interface coupler to create an optical path orthogonal to the fluid pat; directing an EMR beam through each of the sample optical flow cell and the reference optical flow cell, wherein the beam originates from a single EMR source and passes through a multichannel optical switch comprising a fiber optic switch before being directed through each of the sample optical flow cell and the reference optical flow cell; detecting transmitted EMR, scattered EMR, or combinations thereof, at two angles from each of the sample optical flow cell and the reference optical flow cell, and determining a property of the sample (e.g., the particle size of the compound in the sample) through an algorithm. In further embodiments, the controller is configured to perform internal calibration through a continuous feedback loop derived from the plurality of reference optical flow cells to provide baseline correction, spectral drift correction, EMR source degradation correction, EMR source power normalization, detector response normalization, or combinations thereof, in real-time for particulate-containing solutions or suspensions, including, dilute solutions having particle size ranges from about 10 nanometers to about 10 microns.

In embodiments, the methods described herein include a modified Guinier algorithm, believed to provide a particle size calculation. The modified Guinier algorithm is derived from combining a Guinier Plot approximation with form factors extracted from measured angular response. The modified Guinier algorithm includes the steps of: (1) Calculate in real-time the sample signal by subtracting baseline solvent signal for each scattering angle without the need to measure the incident intensity ($I_0$); (2) Calculate scattering vector Component Q (a function of scattering angle and the refractive index for a given laser wavelength); (3) Solve Rg (radius of gyration) from a modified Guinier approximation without the zero angle term contribution; and (4) Rg value is solved from a minimum of two angular scattering response data without concentration term and zero angle scattering value.

In further aspects, provided herein are methods for detecting a property of at least one sample. The method includes receiving, via a sample inlet line, at least one sample fluid an integrated, upstream UV detection system, to a sample optical flow cell, where the optical flow cell has at least one optical interface coupler to create an optical path orthogonal to the fluid path and simultaneously receiving, via a reference inlet line, at least one reference fluid, to a reference optical flow cell, wherein the reference optical flow cell comprises at least one optical interface coupler to create an optical path orthogonal to the fluid path; directing an EMR beam through each of the sample optical flow cell and the reference optical flow cell, wherein the beam originates from a single EMR source and passes through a multichannel optical switch comprising a fiber optic switch before being directed through each of the sample optical flow cell and the reference optical flow cell; detecting transmitted EMR, scattered EMR, or combinations thereof, at two angles from each of the sample optical flow cell and the reference optical flow cell, and determining a property of the sample (e.g., the particle size of the compound in the sample) through a Lorentz Mie scattering algorithm utilizing concentration output derived from the integrated, upstream UV detection system, which is believed to provide a particle size calculation.

The Lorentz Mie scattering algorithm includes the steps of: (1) Calculate the Rayleigh Excess Ratio from the scattering signals measured at multiple angles, wherein the Rayleigh ratio is the ratio of scattering intensity at a particular angle to the incident intensity ($I_0$) and the Rayleigh Excess Ratio is obtained after subtracting the solvent contribution obtained during initial system calibration; (2) Use Lorentz Mie scattering theory to derive the size (assuming a spherical model), by calculating the differential scattered intensity of a single particle at each of the multiple scattering angles (including zero angle and low angles) whose Rayleigh Excess ratios have been measured; and (3) From a selected Rayleigh Excess ratio collected at multiple angles (including zero angle and low angles) and the calculated differential scattered intensity determine the number density of particles in the contributing irradiated volume.

In further embodiments, the controller is configured to perform internal calibration through a continuous feedback loop derived from the plurality of reference optical flow cells to provide baseline correction, spectral drift correction, EMR source degradation correction, EMR source power normalization, or combinations thereof, in real-time for particulate-containing solutions or suspensions, including, dilute solutions having particle size ranges from about 10 nanometers to about 10 microns.

In further aspects, provided herein is an in-line, multi-angle light scattering detection system, including a plurality of reference optical flow cells configured to continuously receive a reference fluid; a plurality of sample optical flow cells configured to continuously receive a sample; a single electromagnetic radiation (EMR) source; at least one optical interface coupler per optical flow cell; a multichannel optical switch configured to receive the EMR from the single EMR source, the multichannel optical switch comprising a fiber optic switch configured to generate a plurality of EMR beams from the single EMR source, wherein each EMR beam is configured to pass through each of the plurality of the reference optical flow cells and plurality of sample optical flow cells; a plurality of detectors positioned at a plurality of angles, each one of the plurality of detectors configured to receive transmitted EMR, scattered EMR, or combinations thereof, from one of the plurality of reference optical flow cells and plurality of sample optical flow cells; and a controller operably coupled with the plurality of detectors and configured to continuously detect the size of the sample in each of the optical flow cells.

EXAMPLES

The following examples illustrate certain specific embodiments of the invention and are not meant to limit the scope of the invention.

Embodiments herein are further illustrated by the following examples and detailed protocols. However, the examples are merely intended to illustrate embodiments and are not to be construed to limit the scope herein. The contents of all references and published patents and patent applications cited throughout this application are hereby incorporated by reference.

Example 1: Absorption Spectroscopy Detection Systems and Methods as Described Herein In Example 1, the in-line absorption spectroscopy detection system 200 and corresponding method described herein are used in conjunction with a free-flow electrophoresis system with 10 outlets. For example, the detection system uses a single wavelength (280 nm), 70 milliwatt (mW) LED to irradiate a reference and 10 sample optical flow cells, by diverting the LED output via a mechanical switch to independent fiber optic cables coupled to each discrete flow cell by optical interface couplers and to detect transmitted EMR. For example, the optical path of the single EMR source LED is split into 10 sample outputs and a single reference output. Thus, the exemplary embodiment of Example 1 corrects for spectral drift, light source degradation, detector response normalization, and baseline correction. By accounting for these parameters (spectral drift, light source degradation, detector response normalization, and baseline correction), a more reproducible and more accurate output was achieved, especially for dilute solutions.

A control system can further be configured with an algorithm or a computer-implemented method executed by the control system based on the transmitted EMR detected to determine a property of the sample, such as concentration, or a change in a continuous flow of sample.

In other aspects, the system is configured to correct for the detector gain differences or the output power from the single EMR source (e.g., the laser or LED). For example, where the detector's gains are different, the system is configured to transmit more power into a channel where the detector's gains are lower. As the system continues operation, changes in the single EMR source power or full-width at half-maximum (FWHM) or changes in the optical interface due to contamination (e.g., adsorption phenomena) may be significant, which then the system and methods, as described herein accounts for with a feedback loop. For example, a feedback loop control mechanism is in place within the detection system, which accounts for degradation of the single EMR source such that the same power is relayed into each fiber optic cable during continuous operation for long periods of time. The feedback loop is run by a software algorithm signaling to the EMR source.

Figure 3A:
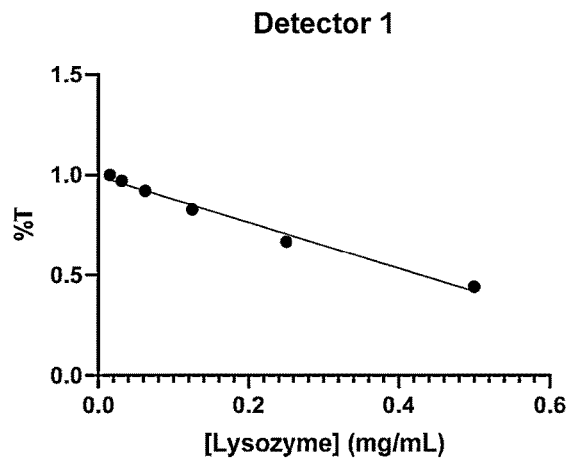
FIGS. 3A-3E are graphs showing the continuous independent detector linearity of signal (% Transmittance; % T) for the in-line detection of serial dilutions of lysozyme flowing through 4 discrete opaque sample flow cells of a multi-channel, in-line UV detection system (FIG. 3A-3D).
Figure 3D:
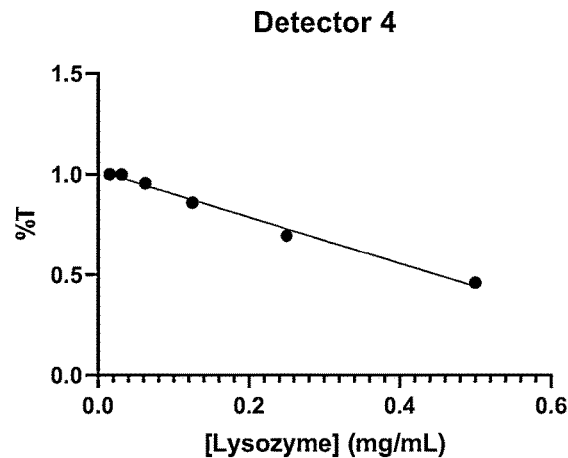
Figure 3B:
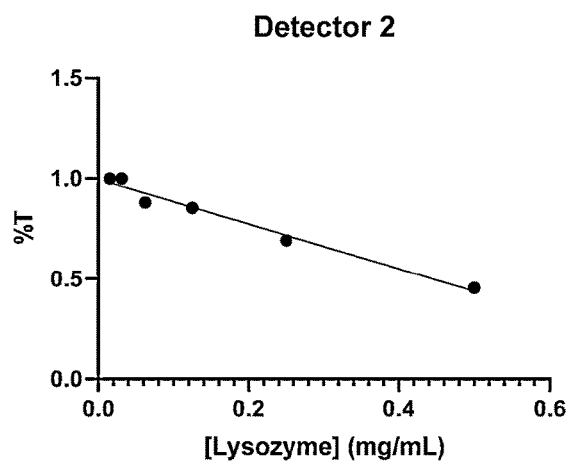
Figure 3E:
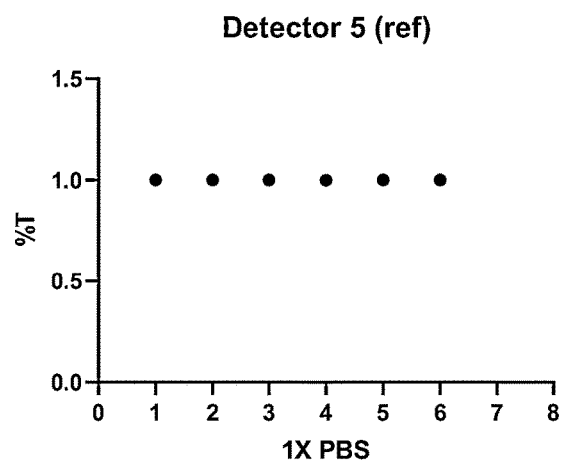
Figure 3C:
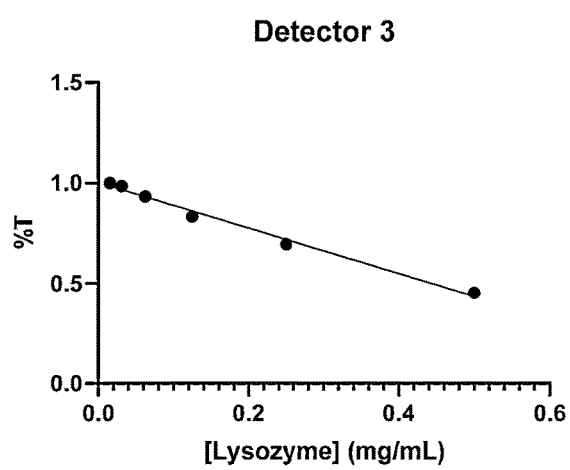
Figure 4A:
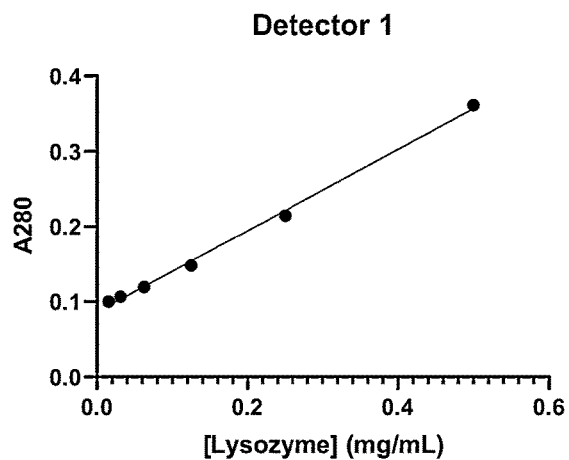
FIGS. 4A-4E are graphs showing the continuous independent detector linearity of signal (A280) for the in-line detection of serial dilutions of lysozyme flowing through 4 discrete opaque sample flow cells of a multi-channel, in-line UV detection system (FIGS. 4A-4D).
Figure 4D:
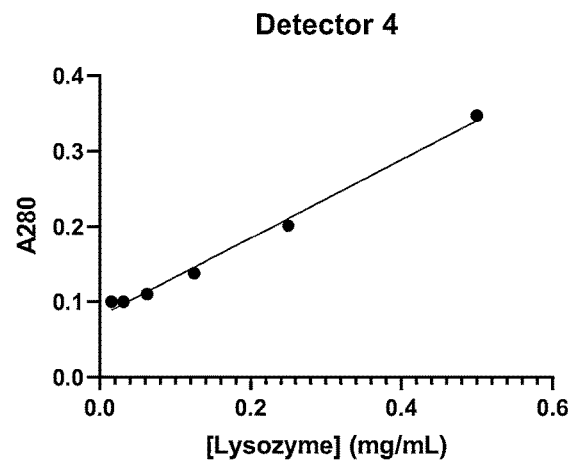
Figure 4B:
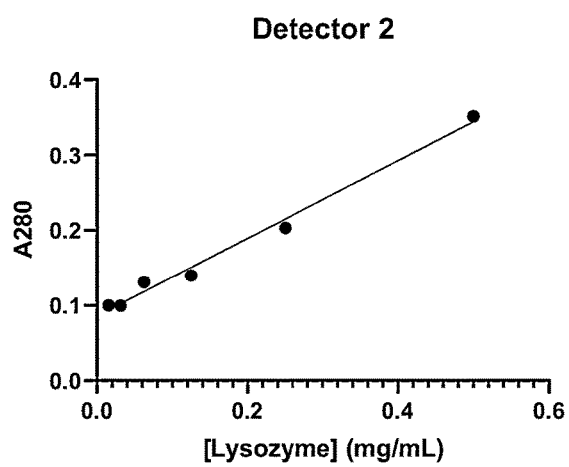
Figure 4E:
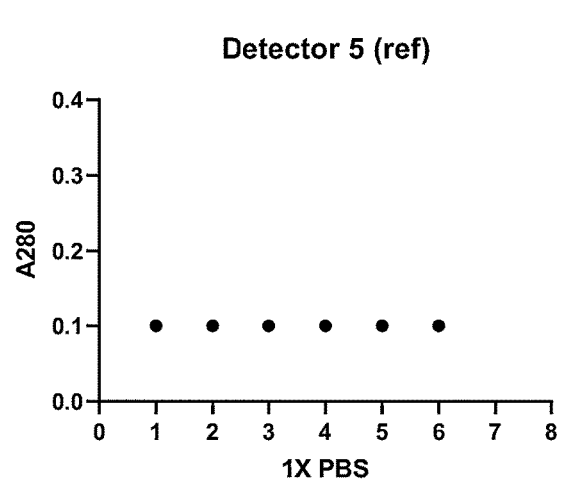
Figure 4C:
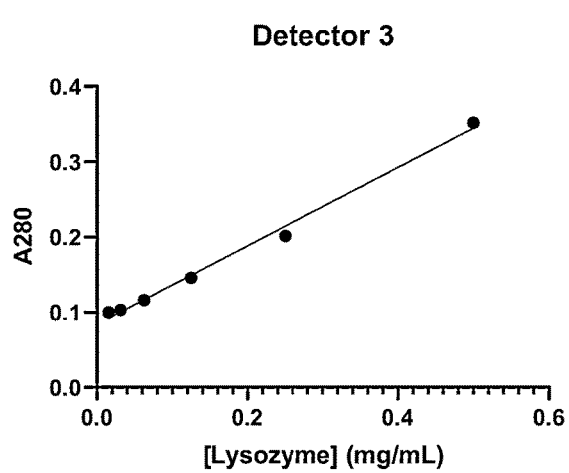

Example 2: Detector Linearity of a 5-Channel UV Absorption Spectroscopy Detection System In Example 2, a 5-channel UV absorption spectroscopy detection system was created to have a single reference and 4 sample optical flow cells derived from a single LED source having a single output wavelength of 280 nm. The system was utilized to detect transmitted and absorbed EMR arising from serial dilutions of 0.5 mg/mL Lysozyme in 1× phosphate buffered saline (1× PBS) continuously flowing (5 mL/min) through 4 discrete sample optical flow cells, wherein each flow cell contains the same serial dilution at the same time (FIGS. 3A-3D and FIGS. 4A-4D) and 1× PBS continuously flowing (5 mL/min) through a single reference optical flow cell (FIG. 3E and FIG. 4E). FIGS. 3A-3E are graphs showing the continuous independent detector linearity of signal (% Transmittance; % T) for the in-line detection of serial dilutions of lysozyme flowing through 4 discrete opaque sample flow cells of a multi-channel, in-line UV detection system (FIG. 3A-3D). FIG. 3E is a graph showing the stable signal (% Transmittance) of the opaque reference flow cell. FIGS. 4A-4E are graphs showing the continuous independent detector linearity of signal (A280) for the in-line detection of serial dilutions of lysozyme flowing through 4 discrete opaque sample flow cells of a multi-channel, in-line UV detection system (FIGS. 4A-4D). FIG. 4E is a graph showing the stable signal (A280) of the opaque reference flow cell. These data show the linearity of each detector in the system in accordance with Beer's Law.

Figure 5A:
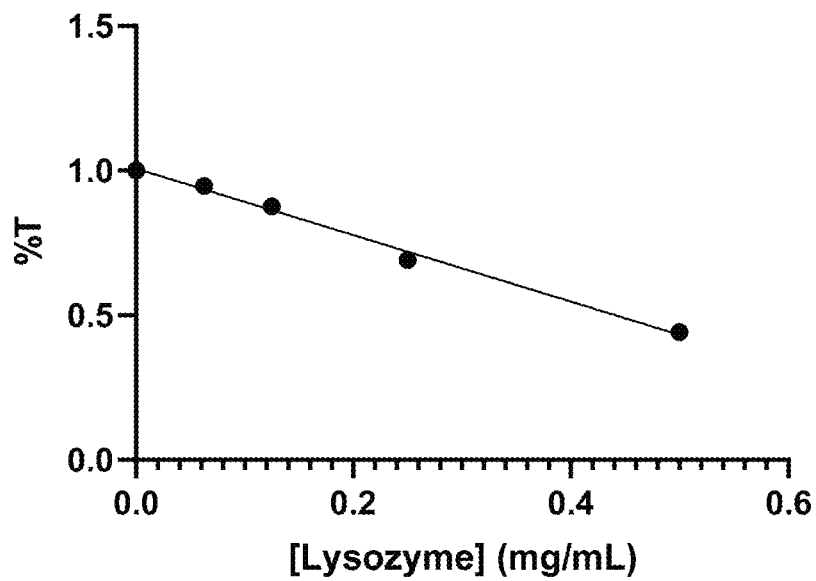
FIGS. 5A and 5B are data showing the linearity of the signal (% Transmittance; % T) for the continuous, in-line detection of a serial dilution of lysozyme wherein a discrete concentration of Lysozyme is flowing through one of 4 discrete opaque sample flow cells and a reference buffer solution is flow through one opaque reference flow cell of a multi-channel, in-line UV detection system (FIG. 5A).
Figure 5B:
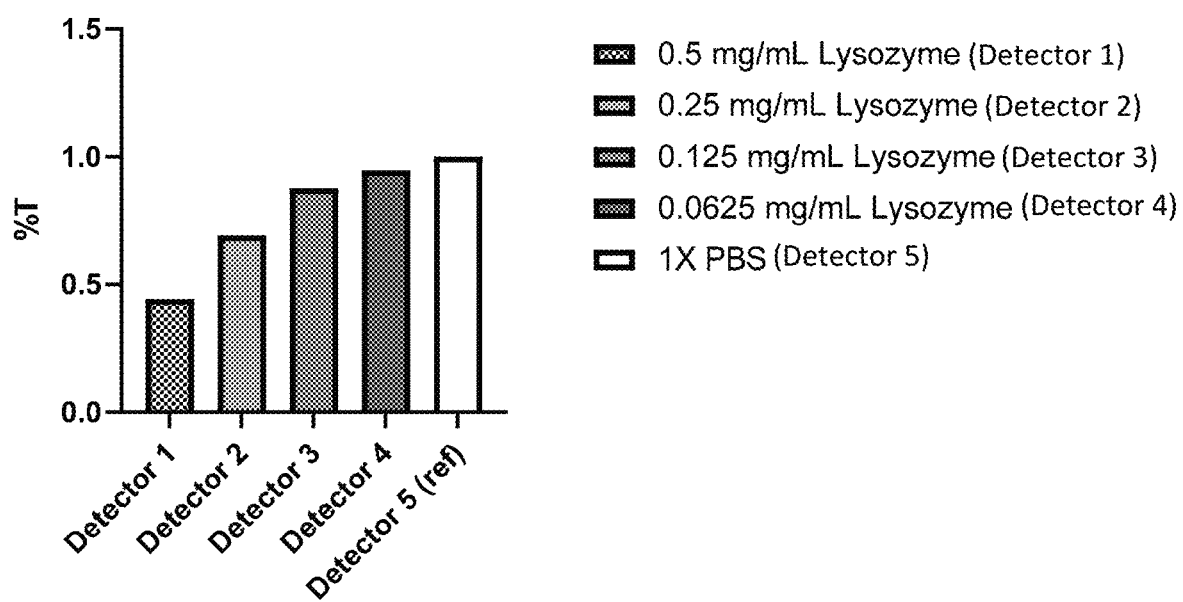

Example 3: Detection of Lysozyme With a 5-Channel UV Absorption Spectroscopy Detection System In Example 3, a 5-channel UV absorption spectroscopy detection system was created to have a single reference and 4 sample optical flow cells derived from a single LED source having a single output wavelength of 280 nm. The system was utilized to detect transmitted EMR arising from serial dilutions of 0.5 mg/mL Lysozyme in 1× phosphate buffered saline (1× PBS) continuously flowing (5 mL/min) through 4 discrete sample optical flow cells, wherein each flow cell contains a different serial dilution at the same time, and 1× PBS continuously flowing (5 mL/min) through a single reference optical flow cell (FIGS. 5A and 5B). FIGS. 5A and 5B are data showing the linearity of the signal (% Transmittance; % T) for the continuous, in-line detection of a serial dilution of lysozyme wherein a discrete concentration of Lysozyme is flowing through one of 4 discrete opaque sample flow cells and a reference buffer solution is flow through one opaque reference flow cell of a multi-channel, in-line UV detection system (FIG. 5A). FIG. 5B is a bar graph showing the signal (% Transmittance; % T) at each detector of the opaque sample and reference flow cells. These data show the ability to measure discrete sample outlet concentration and the linearity of the detection system in accordance with Beer's Law.

Figure 6A:
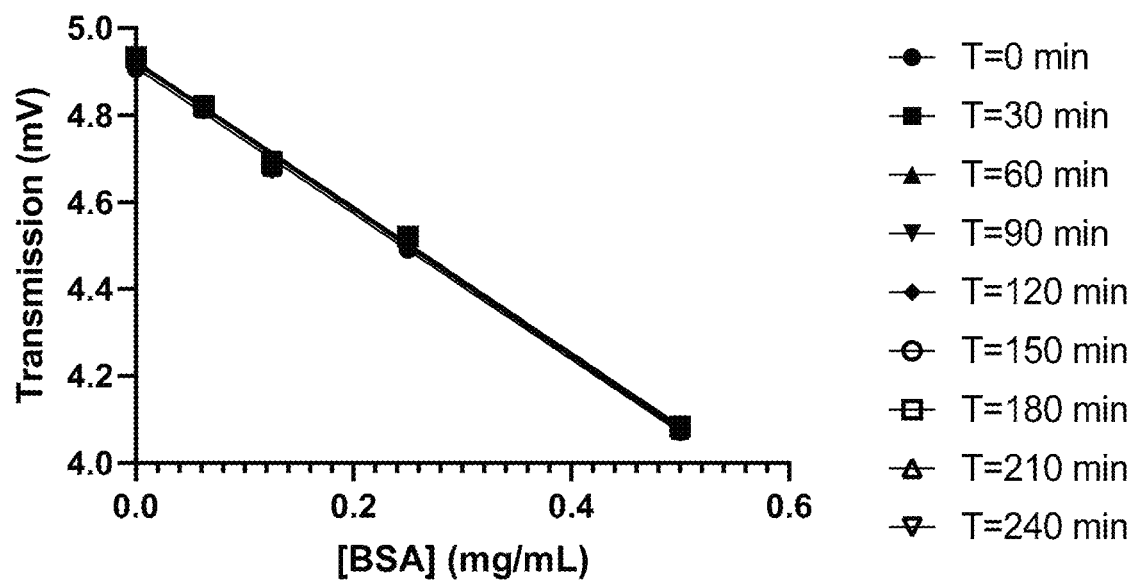
FIGS. 6A and 6B are graphs showing the longitudinal evaluation of the linearity of the signal (% Transmittance; % T) for the continuous, in-line detection of a serial dilution of bovine serum albumin (BSA) wherein a discrete concentration of BSA is flowing through one of 4 discrete opaque sample flow cells and a reference buffer solution is flow through one opaque reference flow cell of a multi-channel, in-line UV detection system during prolonged, continuous operation (FIG. 6A).
Figure 6B:
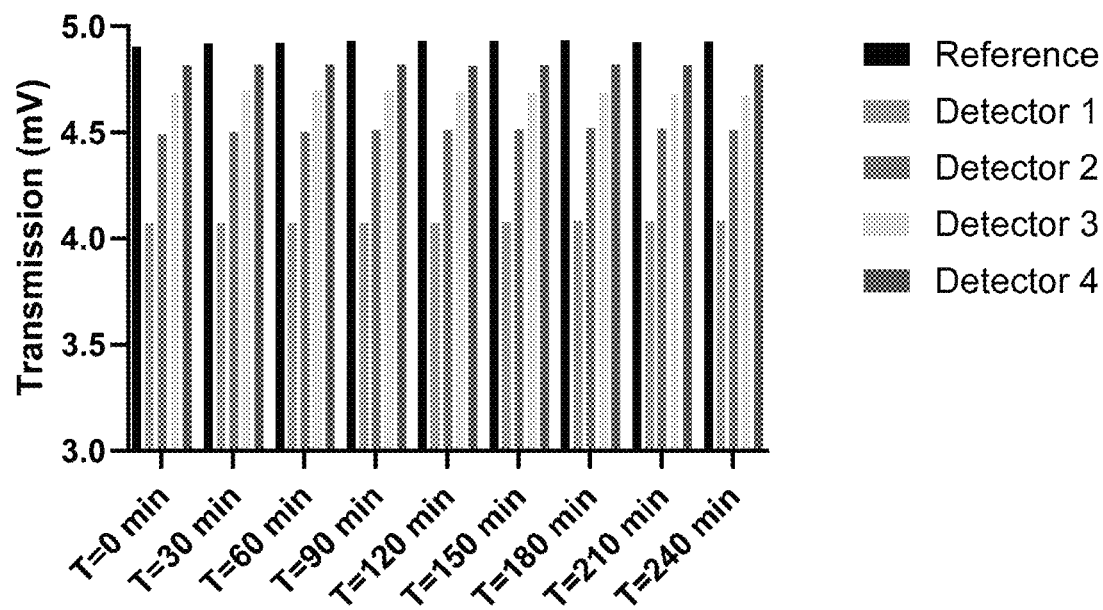

Example 4: Continuous, Long-Term Detection of BSA With a 5-Channel UV Absorption Spectroscopy Detection System In Example 4, a 5-channel UV absorption spectroscopy detection system was created to have a single reference and 4 sample optical flow cells derived from a single LED source having a single output wavelength of 280 nm. The system was utilized to detect transmitted EMR arising from serial dilutions of 0.5 mg/mL BSA in 1× phosphate buffered saline (1× PBS) continuously flowing (5 mL/min) through 4 discrete sample optical flow cells, wherein each flow cell contains a different serial dilution at the same time, and 1×0 PBS continuously flowing (5 mL/min) through a single reference optical flow cell (FIGS. 6A and 6B) for 4 hours. FIGS. 6A and 6B are graphs showing the longitudinal evaluation of the linearity of the signal (% Transmittance; % T) for the continuous, in-line detection of a serial dilution of bovine serum albumin (BSA) wherein a discrete concentration of BSA is flowing through one of 4 discrete opaque sample flow cells and a reference buffer solution is flow through one opaque reference flow cell of a multi-channel, in-line UV detection system during prolonged, continuous operation (FIG. 6A). FIG. 6B shows the signal (% Transmittance; % T) at each detector of the opaque sample and reference flow cells during prolonged, continuous operation. In FIG. 6B, for each time point the bar graphs are shown in the order of Reference, Detector 1, Detector 2, Detector 3, and Detector 4. These data show the ability to continuously measure discrete sample outlet concentration and the linearity of the detection system in accordance with Beer's Law over long periods of time.

Example 5: Fluorescence Spectroscopy Detection Systems and Methods as Described Herein In Example 5, the in-line fluorescence spectroscopy detection system 300 and corresponding method described herein are used in conjunction with a free-flow electrophoresis system with 10 outlets. For example, the detection system uses a single wavelength (280 nm), 70 milliwatt (mW) LED to excite a reference and 10 sample optical flow cells, by diverting the LED output via a mechanical switch to independent fiber optic cables coupled to each discrete flow cell by optical interface couplers and to detect emitted EMR at 320 nm through a bandpass filter. For example, the optical path of the single EMR source LED is split into 10 sample outputs and a single reference output. Thus, the exemplary embodiment of Example 2 corrects for spectral drift, light source degradation, detector response normalization, and baseline correction. By accounting for these parameters (spectral drift, light source degradation, detector response normalization, and baseline correction), a more reproducible and more accurate output was achieved, especially for dilute solutions.

A control system can further be configured with an algorithm or a computer-implemented method executed by the control system based on the transmitted EMR detected to determine a property of the sample, such as concentration, or a change in a continuous flow of sample.

In other aspects, the system is configured to correct for the detector gain differences or the output power from the single EMR source (e.g., the laser or LED). For example, where the detector's gains are different, the system is configured to transmit more power into a channel where the detector's gains are lower. As the system continues operation, changes in the single EMR source power or full-width at half-maximum (FWHM) or changes in the optical interface due to contamination (e.g. adsorption phenomena) may be significant, which then the system and methods, as described herein accounts for with a feedback loop. For example, a feedback loop control mechanism is in place within the detections system, which accounts for degradation of the single EMR source such that the same power is relayed into each fiber optic cable during continuous operation for long periods of time. The feedback loop is run by a software algorithm signaling to the EMR source.

In some aspects of the present application, a detection system comprising a plurality of reference optical flow cells configured to continuously receive a reference fluid; a plurality of sample optical flow cells configured to continuously receive a sample; and a single electromagnetic radiation (EMR) source is disclosed. The detection system further comprises a multichannel optical switch configured to receive the EMR from the single EMR source. The multichannel optical switch comprising a fiber optic switch configured to generate a plurality of EMR beams from the single EMR source. Each EMR beam is configured to pass through each of the plurality of the reference optical flow cells and plurality of sample optical flow cells. The detection system further comprises a plurality of detectors. Each one of the plurality of detectors configured to receive EMR from each of the plurality of reference optical flow cells and plurality of sample optical flow cells. The detection system further comprises a controller operably coupled with the plurality of detectors and configured to continuously detect a property of the sample in each of the optical flow cells with respect to at least one reference optical flow cell.

In the detection system described above, the single EMR source may comprise a light emitting diode, a laser, a lamp, or a bulb. In some examples, the single EMR source emits radiation having a wavelength ranging between 190-1100 nm. In some examples, the single EMR source emits a single wavelength. In some examples, the single EMR source is collimated. In some examples, the plurality of reference optical flow cells and the plurality of sample optical flow cells each comprise at least one optical interface coupler configured to create a discrete optical path orthogonal to the reference fluid or sample fluid. In some examples, the plurality of reference optical flow cells and the plurality of sample optical flow cells are optically opaque or transparent. In some examples, the plurality of reference optical flow cells and the plurality of sample optical flow cells have an optical path length ranging from about 0.1 mm to about 10 cm. In some examples, the plurality of reference optical flow cells enable internal calibration of the system via a feedback loop derived from the reference fluid. In some examples, the reference fluid is received by a continuous supply, a recirculated supply, or a statically held supply. In some examples, the detection system described above further comprise fiber optic cables. The fiber optic cables may have a numerical aperture ranging from 0.1 to 0.6. The fiber optic cables may comprise a core diameter ranging from 0.1 mm to 1 mm. In some examples, the fiber optic switch comprises at least one electromechanical switch to sequentially divert the EMR derived from the single EMR source to the plurality of reference optical flow cells and the plurality of sample optical flow cells. In some examples, the multichannel optical switch comprises at least one fiber optic switch, and wherein each EMR beam is generated from the single EMR source in less than 50 milliseconds. In some examples, the plurality of detectors comprise a photodiode detector, a photodiode array detector, a diode array detector, a photomultiplier tube, or a charge-couple device (CCD) detector. The plurality of detectors may further comprise at least one bandpass filter. In some examples, the plurality of detectors are configured to receive EMR at least one angle. In some examples, the reference fluid and sample fluid comprise aqueous liquid media, organic solvent liquid media, or combinations thereof. In some examples, the reference fluid and sample fluid are received to the reference optical flow cell and the sample optical flow cell, respectively, at equivalent flow rates, different flow rates, or combinations thereof. In some examples, the reference fluid and sample fluid are received at flow rates ranging from about 0.01 mL/hr to about 1 L/min. In some examples, the sample comprises organic small-molecules, organic macromolecules, metal complexes, metal chelates, polymers, microparticles, nanoparticles, biological products, liposomes, lipid nanoparticles, exosomes, extracellular vesicles, membrane vesicles, cells, viruses, bacteria, capsids, virus-like particles, peptides, proteins, antibodies, oligonucleotides, plasmids, mRNA, siRNA, RNAi, microRNA, adenoviruses, lentiviruses, adeno-associated viruses, oncolytic viruses, or combinations thereof. In some examples, the detection system is configured to receive a sample from a flow-based or pressure driven flow-based apparatus. The flow-based or pressure driven flow-based apparatus may be a free-flow electrophoresis apparatus.

In another aspect of the present application an in-line, absorption spectroscopy detection system is provided. The in-line, absorption spectroscopy detection system comprises a plurality of reference optical flow cells configured to continuously receive a reference fluid; a plurality of sample optical flow cells configured to continuously receive a sample; a single electromagnetic radiation (EMR) source; two optical interface couplers per optical flow cell; and a multichannel optical switch configured to receive the EMR from the single EMR source. The multichannel optical switch comprising a fiber optic switch configured to generate a plurality of EMR beams from the single EMR source. Each EMR beam is configured to pass through each of the plurality of the reference optical flow cells and plurality of sample optical flow cells. The in-line, absorption spectroscopy detection system further comprises a plurality of detectors. Each one of the plurality of detectors configured to receive a transmitted EMR from one of the plurality of reference optical flow cells and plurality of sample optical flow cells. The in-line, absorption spectroscopy detection system further comprises a controller operably coupled with the plurality of detectors and configured to continuously detect the concentration of the sample in each of the optical flow cells.

In another aspect of the present application, an in-line, fluorescence spectroscopy detection system is provided. The in-line, fluorescence spectroscopy detection system comprises a plurality of reference optical flow cells configured to continuously receive a reference fluid; a plurality of sample optical flow cells configured to continuously receive a sample; a single electromagnetic radiation (EMR) source; two optical interface couplers per optical flow cell; and a multichannel optical switch configured to receive the EMR from the single EMR source. The multichannel optical switch comprising a fiber optic switch configured to generate a plurality of EMR beams from the single EMR source. Each EMR beam is configured to pass through each of the plurality of the reference optical flow cells and plurality of sample optical flow cells. The in-line, fluorescence spectroscopy detection system further comprises a plurality of detectors. Each one of the plurality of detectors configured to receive a transmitted EMR from one of the plurality of reference optical flow cells and plurality of sample optical flow cells. The in-line, fluorescence spectroscopy detection system further comprises at least one bandpass filter; and a controller operably coupled with the plurality of detectors and configured to continuously detect the concentration of the sample in each of the optical flow cells.

In another aspect of the present application, an in-line, multi-angle light scattering detection system is provided. The in-line, multi-angle light scattering detection system comprises a plurality of reference optical flow cells configured to continuously receive a reference fluid; a plurality of sample optical flow cells configured to continuously receive a sample; a single electromagnetic radiation (EMR) source; at least one optical interface coupler per optical flow cell; and a multichannel optical switch configured to receive the EMR from the single EMR source. The multichannel optical switch comprising a fiber optic switch configured to generate a plurality of EMR beams from the single EMR source. Each EMR beam is configured to pass through each of the plurality of the reference optical flow cells and plurality of sample optical flow cells. The in-line, multi-angle light scattering detection system further comprises a plurality of detectors positioned at a plurality of angles. Each one of the plurality of detectors configured to receive transmitted EMR, scattered EMR, or combinations thereof, from one of the plurality of reference optical flow cells and plurality of sample optical flow cells. The in-line, multi-angle light scattering detection system further comprises a controller operably coupled with the plurality of detectors and configured to continuously detect the size of the sample in each of the optical flow cells.

While the invention has been described in conjunction with the detailed description thereof, the foregoing description is intended to illustrate and not limit the scope of the invention, which is defined by the scope of the appended claims. Other aspects, advantages, and modifications are within the scope of the following claims.

The patent and scientific literature referred to herein establishes the knowledge that is available to those with skill in the art. All references, e.g., U.S. patents, U.S. patent application publications, PCT patent applications designating the U.S., published foreign patents and patent applications cited herein are incorporated herein by reference in their entireties. Genbank and NCBI submissions indicated by accession number cited herein are incorporated herein by reference. All other published references, documents, manuscripts, and scientific literature cited herein are incorporated herein by reference. In the case of conflict, the present specification, including definitions, will control. In addition, the materials, methods, and examples are illustrative only and not intended to be limiting.

While this invention has been particularly shown and described with references to preferred embodiments thereof, it will be understood by those skilled in the art that various changes in form and details may be made therein without departing from the scope of the invention encompassed by the appended claims.

The invention described and claimed herein is not to be limited in scope by the specific embodiments herein disclosed since these embodiments are intended as illustrations of several aspects of this invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All publications cited herein are incorporated by reference in their entirety.

What is claimed is:

1. A detection system, comprising:
   at least one reference optical flow cell configured to continuously receive a reference fluid;
   at least one sample optical flow cell configured to continuously receive a sample;
   a single electromagnetic radiation (EMR) source, wherein the single EMR source is collimated;
   a multichannel optical switch configured to receive the EMR from the single EMR source, the multichannel optical switch comprising a fiber optic switch configured to generate a plurality of EMR beams from the single EMR source, wherein each EMR beam is configured to pass through one of the at least one reference optical flow cell or one of the at least one sample optical flow cell, and wherein each of the at least one reference optical flow cell and the at least one sample optical flow cell comprise at least one optical interface coupler configured to create a discrete optical path orthogonal to the reference fluid or sample fluid;
   a plurality of detectors, each one of the plurality of detectors is configured to receive EMR passed through one of the at least one reference optical flow cell or one of the at least one sample optical flow cell; and
   a controller operably coupled with the plurality of detectors and configured to continuously detect a property of the sample in one of the at least one optical flow cell with respect to the at least one reference optical flow cell.

2. The detection system of claim 1, wherein the single EMR source comprises a light emitting diode, a laser, a lamp, or a bulb.

3. The detection system of claim 1, wherein the single EMR source emits radiation having a wavelength ranging between 190-1100 nm.

4. The detection system of claim 1, wherein the single EMR source emits a single wavelength.

5. The detection system of claim 1, wherein the at least one reference optical flow cell and the at least one sample optical flow cell are optically opaque or transparent.

6. The detection system of claim 1, wherein the at least one reference optical flow cell and the at least one sample optical flow cell have an optical path length ranging from about 0.1 mm to about 10 cm.

7. The detection system of claim 1, wherein the at least one reference optical flow cell provide internal calibration of the system via a feedback loop derived from the reference fluid.

8. The detection system of claim 1, wherein the reference fluid is received by a continuous supply, a re-circulated supply, or a statically held supply.

9. The detection system of claim 1, further comprising fiber optic cables.

10. The detection system of claim 9, wherein the fiber optic cables have a numerical aperture ranging from 0.1 to 0.6.

11. The detection system of claim 9, wherein the fiber optic cables comprise a core diameter ranging from 0.1 mm to 1 mm.

12. The detection system of claim 1, wherein the fiber optic switch comprises at least one electromechanical switch to sequentially divert the EMR derived from the single EMR source to the at least one reference optical flow cell and the at least one sample optical flow cell.

13. The detection system of claim 1, wherein the multichannel optical switch comprises at least one fiber optic switch, and wherein each EMR beam is generated from the single EMR source in less than 50 milliseconds.

14. The detection system of claim 1, wherein the plurality of detectors comprise a photodiode detector, a photodiode array detector, a diode array detector, a photomultiplier tube, or a charge-couple device (CCD) detector.

15. The detection system of claim 14, wherein the plurality of detectors further comprise at least one bandpass filter.

16. The detection system of claim 1, wherein the plurality of detectors are configured to receive EMR at least one angle.

17. The detection system of claim 1, wherein the reference fluid and sample fluid comprise aqueous liquid media, organic solvent liquid media, or combinations thereof.

18. The detection system of claim 1, wherein the reference fluid and sample fluid are received by the reference optical flow cell and the sample optical flow cell, respectively, at equivalent flow rates, different flow rates, or combinations thereof.

19. The detection system of claim 1, wherein the reference fluid and sample fluid are received at flow rates ranging from about 0.01 mL/hr to about 1 L/min.

20. The detection system of claim 19, wherein the flow-based or pressure driven flow-based apparatus is a free-flow electrophoresis apparatus.

21. The detection system of claim 1, wherein the sample comprises organic small-molecules, organic macromolecules, metal complexes, metal chelates, polymers, microparticles, nanoparticles, biological products, liposomes, lipid nanoparticles, exosomes, extracellular vesicles, membrane vesicles, cells, viruses, bacteria, capsids, virus-like particles, peptides, proteins, antibodies, oligonucleotides, plasmids, mRNA, siRNA, RNAi, microRNA, adenoviruses, lentiviruses, adeno-associated viruses, oncolytic viruses, or combinations thereof.

22. The detection system of claim 1, wherein the detection system is configured to receive a sample from a flow-based or pressure driven flow-based apparatus.

* * * * *